US012321821B2

(12) United States Patent
Ramette et al.

(10) Patent No.: US 12,321,821 B2
(45) Date of Patent: Jun. 3, 2025

(54) ALL-CONNECTED, CAVITY-MEDIATED QUANTUM COMPUTING WITH LOCAL QUANTUM PROCESSORS

(71) Applicant: Massachusetts Institute of Technology, Cambridge, MA (US)

(72) Inventors: Joshua Ramette, Cambridge, MA (US); Josiah Sinclair, Cambridge, MA (US); Vladan Vuletic, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 859 days.

(21) Appl. No.: 17/460,385

(22) Filed: Aug. 30, 2021

(65) Prior Publication Data

US 2022/0138608 A1 May 5, 2022

Related U.S. Application Data

(60) Provisional application No. 63/169,496, filed on Apr. 1, 2021, provisional application No. 63/107,666, filed on Oct. 30, 2020.

(51) Int. Cl.
*G06N 10/00* (2022.01)
*G06F 9/30* (2018.01)

(52) U.S. Cl.
CPC ......... *G06N 10/00* (2019.01); *G06F 9/30101* (2013.01)

(58) Field of Classification Search
CPC ........ G06N 10/00; G06N 10/20; G06N 10/40; G06F 9/30101
See application file for complete search history.

(56) References Cited

U.S. PATENT DOCUMENTS

| | | | | |
|---|---|---|---|---|
| 11,119,773 | B1* | 9/2021 | Soeken | G06F 15/82 |
| 11,475,347 | B1* | 10/2022 | Rudolph | G06N 10/00 |
| 11,985,233 | B2* | 5/2024 | Berend | G06N 10/00 |
| 12,093,783 | B1* | 9/2024 | Buck, Jr. | H01S 3/0057 |
| 2020/0028312 | A1* | 1/2020 | Monroe | G06N 10/00 |
| 2020/0372389 | A1* | 11/2020 | Nam | G06N 10/70 |
| 2021/0374586 | A1* | 12/2021 | Kliuchnikov | G06N 10/20 |
| 2021/0398009 | A1* | 12/2021 | Vuletic | G21K 1/06 |

(Continued)

OTHER PUBLICATIONS

Altman et al. "Quantum Simulators: Architectures and Opportunities." arXiv e-prints (2019): arXiv-1912, 41 pages.

(Continued)

*Primary Examiner* — Nha T Nguyen
(74) *Attorney, Agent, or Firm* — Smith Baluch LLP

(57) ABSTRACT

An all-to-all coupled, high-fidelity, error-correctable quantum computer can scale to hundreds of qubits within a single cavity of moderate cooperativity with existing neutral atom technology. This quantum processor can enact teleported gates among any pair of qubits using a local Rydberg interaction between each qubit and a separate network of atoms that distribute entanglement via a cavity mode. Small atomic ensembles at network nodes allow for ultrafast, nondestructive readout with high fidelity by substantially shifting the resonance of even a poor-quality cavity. Fast readout enables near-deterministic entanglement distribution among network atoms despite cavity losses as well as syndrome measurements of qubit atoms for error correction.

15 Claims, 20 Drawing Sheets

(56) References Cited

U.S. PATENT DOCUMENTS

| | | | |
|---|---|---|---|
| 2022/0172096 A1* | 6/2022 | Rudolph | B82Y 20/00 |
| 2022/0222560 A1* | 7/2022 | Monroe | G06N 10/80 |
| 2022/0222567 A1* | 7/2022 | Reagor | G06N 10/40 |
| 2022/0231844 A1* | 7/2022 | Berend | G06N 10/00 |
| 2022/0269301 A1* | 8/2022 | Hatridge | G02F 1/365 |
| 2023/0040289 A1* | 2/2023 | Sels | G06N 7/01 |
| 2024/0296360 A1* | 9/2024 | Blumel | G06N 10/40 |

OTHER PUBLICATIONS

Auger et al. "Blueprint for fault-tolerant quantum computation with Rydberg atoms." Physical Review A 96.5 (2017): 052320, 6 pages.
Bauer et al. "Report on the NSF Workshop on Enabling Quantum Leap: Quantum algorithms for quantum chemistry and materials." Report on a National Science Foundation Workshop, Alexandria, VA: Jan. 2019, 115 pages.
Bernien et al. "Probing many-body dynamics on a 51-atom quantum simulator." Nature 551.7682 (2017): 579-584.
Bombin "Gauge color codes: optimal transversal gates and gauge fixing in topological stabilizer codes." New Journal of Physics 17.8 (2015): 083002, 14 pages.
Borregaard et al., "Efficient quantum computation in a network with probabilistic gates and logical encoding." arXiv preprint arXiv:1612.06812 (2016). 5 pages.
Borregaard et al., "Heralded quantum gates with integrated error detection in optical cavities." Physical Review Letters 114.11 (2015): 110502. 5 pages.
Borregaard et al., "Long-distance entanglement distribution using individual atoms in optical cavities." arXiv preprint arXiv:1504.03703 (2015). 17 pages.
Brask et al., "A Hybrid Long-Distance Entanglement Distribution Protocol." arXiv preprint arXiv:1004.0083 (2010). 5 pages.
Brask et al., "Fast entanglement distribution with atomic ensembles and fluorescent detection." Physical Review A 81.2 (2010): 020303. 4 pages.
Bravyi et al. "A no-go theorem for a two-dimensional self-correcting quantum memory based on stabilizer codes." New Journal of Physics 11.4 (2009): 043029, 21 pages.
Bravyi et al. "Classification of topologically protected gates for local stabilizer codes." Physical Review Letters 110.17 (2013): 170503, 5 pages.
Brion et al., "Quantum repeater with Rydberg-blocked atomic ensembles in fiber-coupled cavities." Physical Review A 85.4 (2012): 042324. 9 pages.
Campbell et al. "Roads towards fault-tolerant universal quantum computation." Nature 549.7671 (2017): 172-179.
Chen et al., "Carving complex many-atom entangled states by single-photon detection." Physical Review Letters 115.25 (2015): 250502. 5 pages.
Childress et al., "Fault-tolerant quantum repeaters with minimal physical resources and implementations based on single-photon emitters." Physical Review A 72.5 (2005): 052330. 16 pages.
Chou et al., "Deterministic teleportation of a quantum gate between two logical qubits." Nature 561.7723 (2018): 368-373.
Cirac et al., "Quantum communication in a quantum network." Physica Scripta 1998.T76 (1998): 223. 11 pages.
Cohen et al., "Deterministic Quantum Network for Distributed Entanglement and Quantum Computation." arXiv preprint arXiv:1802.08124 (2018). 10 pages.
Dennis et al. "Topological quantum memory." Journal of Mathematical Physics 43.9 (2002): 4452-4505.
Duan et al. "Robust quantum gates on neutral atoms with cavity-assisted photon scattering." Physical Review A 72.3 (2005): 032333, 4 pages.
Duan et al., "Scalable trapped ion quantum computation with a probabilistic ion-photon mapping." arXiv preprint quant-ph/0401020 (2004). 6 pages.
Endres et al. "Atom-by-atom assembly of defect-free one-dimensional cold atom arrays." Science 354.6315 (2016): 1024-1027.
Garcia-Alvarez et al. "Digital quantum simulation of minimal AdS/CFT." Physical Review Letters 119.4 (2017): 040501, 6 pages.
Gottesman et al. "Demonstrating the viability of universal quantum computation using teleportation and single-qubit operations." Nature 402.6760 (1999): 390-393.
Jiang et al., "Distributed quantum computation based on small quantum registers." Physical Review A 76.6 (2007): 062323. 22 pages.
Jiang et al., "Scalable Quantum Networks based on Few-Qubit Registers." arXiv preprint quant-ph/0703029. Nov. 6, 2007. 4 pages.
Julsgaard et al., "Measurement-induced two-qubit entanglement in a bad cavity: Fundamental and practical considerations." arXiv preprint arXiv:1202.4854 (2012). 13 pages.
Kastoryano et al., "Dissipative preparation of entanglement in optical cavities." arXiv preprint arXiv:1011.1441 (2010). 4 pages.
Kastoryano et al., "Dissipative preparation of entanglement in optical cavities." Physical Review Letters 106.9 (2011): 090502. 4 pages.
Madjarov et al. "High-fidelity entanglement and detection of alkaline-earth Rydberg atoms." Nature Physics 16.8 (2020): 857-861.
Pedersen et al., "Few qubit atom-light interfaces with collective encoding." Physical Review A 79.1 (2009): 012320. 5 pages.
Pellizzari et al. "Decoherence, continuous observation, and quantum computing: A cavity QED model." Physical Review Letters 75.21 (1995): 3788, 4 pages.
Reiter et al., "Driving two atoms in an optical cavity into an entangled steady state using engineered decay." New Journal of Physics 14.5 (2012): 053022. 38 pages.
Sorensen et al., "Error-free quantum communication through noisy channels." Physical Review A 58.4 (1998): 2745. 5 pages.
Sorensen et al., "Measurement induced entanglement and quantum computation with atoms in optical cavities." Physical Review Letters 91.9 (2003): 097905. 4 pages.
Sorensen et al., "Probabilistic generation of entanglement in optical cavities." arXiv preprint quant-ph/0206142. Feb. 4, 2003. 5 pages.
Sun et al. "Analysis of atom-photon quantum interface with intracavity Rydberg-blocked atomic ensemble via two-photon transition." Optica 5.12 (2018): 1492-1501.
Svore et al. "Local fault-tolerant quantum computation." Physical Review A 72.2 (2005): 022317, 17 pages.
Terhal "Quantum error correction for quantum memories." Reviews of Modern Physics 87.2 (2015): 307, 40 pages.
Van Enk et al., "Ideal quantum communication over noisy channels: a quantum optical implementation." Physical Review Letters 78.22 (1997): 4293. 4 pages.
Van Enk et al., "Purifying two-bit quantum gates and joint measurements in cavity QED." Physical Review Letters 79.25 (1997): 5178. 4 pages.
Volz et al., "Measurement of the internal state of a single atom without energy exchange." Nature 475.7355 (2011): 210-213.
Wade et al. "Single-atom single-photon coupling facilitated by atomic-ensemble dark-state mechanisms." Physical Review A 94.5 (2016): 053830, 7 pages.
Zhao et al., "Efficient quantum repeater based on deterministic Rydberg gates." arXiv preprint arXiv:1003.1911 (2010). 5 pages.

* cited by examiner

Repeat until successful:

(i) Entangle network atoms (lossy)

(ii) Measure D to verify entanglement success

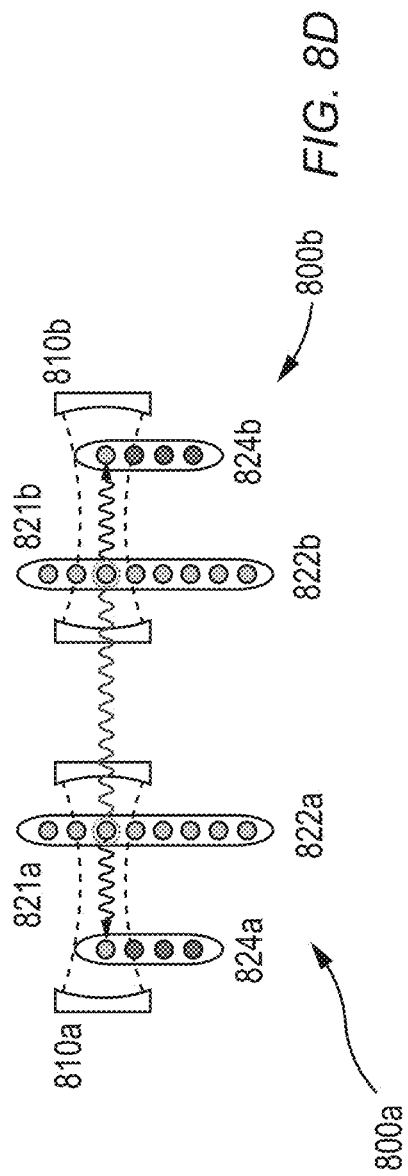
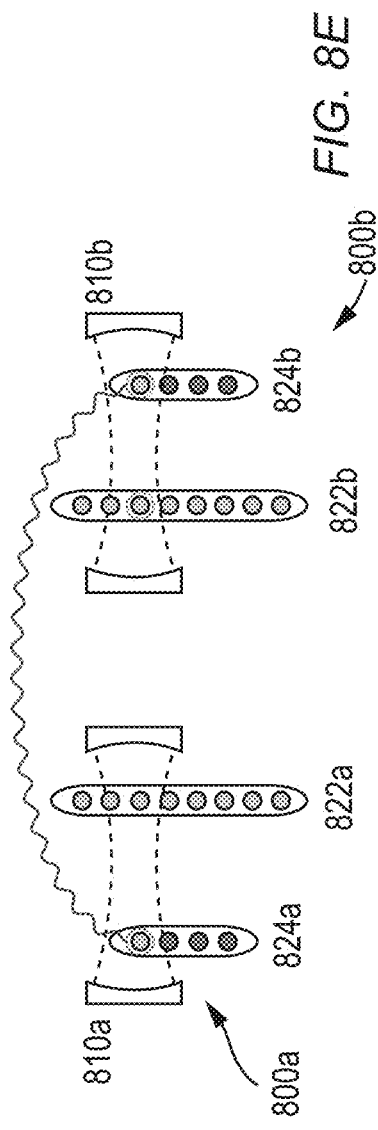

ALL-CONNECTED, CAVITY-MEDIATED QUANTUM COMPUTING WITH LOCAL QUANTUM PROCESSORS

CROSS-REFERENCE TO RELATED APPLICATIONS

This application claims the priority benefit, under 35 U.S.C. 119(e), of U.S. Application No. 63/169,496, entitled "All-Connected, Cavity-Mediated Quantum Computing with Local Quantum Processors" and filed on Apr. 1, 2021, and of U.S. Application No. 63/107,666, entitled "All-Connected, Cavity-Mediated Quantum Computing with Rydberg Fidelity and Ultrafast Readout" and filed on Oct. 30, 2020. Each of these applications is incorporated herein by reference in its entirety.

GOVERNMENT SUPPORT

This invention was made with government support under PHY1806765 awarded by the National Science Foundation, and W911NF-19-1-0517 awarded by the U.S. Army Research Office. The government has certain rights in the invention.

BACKGROUND

Quantum systems with nonlocal interactions display qualitatively different dynamical behaviors from quasi-local systems. Whereas quantum information propagates within an effective light cone for short-range or power-law interactions, nonlocal interactions allow information scrambling at rates logarithmic in the system size. The Sachdev-Ye-Kitaev (SYK) model is an example of a nonlocal Hamiltonian exhibiting chaos and fast scrambling and is of active interest because of its dual quantum gravity description. Many other Hamiltonians of interest use nonlocal gates as well; the molecular Hamiltonian contains non-local terms when encoded in a qubit-based simulator to maintain anti-symmetrization of the many-body electron wavefunction.

Nonlocal gates are particularly favorable for error correction schemes. Error correcting codes can have higher thresholds when nonlocal gates are allowed. Whereas hardware limited to local gates cannot realize codes with qubit arrays of dimension D>3, where D=3 is also generally impractical, nonlocal gates naturally enable the realization of high D-dimensional codes. This high D-dimensional codes can have attractive properties likely not possible for 2D or 1D configurations, such as a universal set of transversal logical qubit operations (3D and higher D gauge color codes) or self-correction with simplified decoding (4D toric code). While most of the effort to develop codes has focused on compatibility with locally constrained hardware, a realistic all-connected architecture like ours may motivate more work on codes unconstrained by locality.

Other attempts to achieve all-to-all connectivity by coupling many atoms to a cavity mode use high-fidelity single-photon sources or cavities of high cooperativity $C \equiv g^2/\kappa\Gamma$, where g is the coupling rate of an atom to the cavity mode, $\kappa$ represents cavity losses, and $\Gamma$ represents scattering. Schemes enacting gates through direct transfers of photons between atoms have errors which scale with the cooperativity as $1/\sqrt{C}$, or success probabilities with similar scaling for heralded schemes. Schemes where the phase of a reflected photon flips depending on the internal state of atoms coupled to a cavity mode have phase errors $1/C$ and also require high-fidelity single-photon sources. Increasing C enough to achieve high-fidelity gates with these attempts is experimentally infeasible and would likely involve both substantially decreasing the mode volume (and thus reducing the number atoms that could couple to the mode) and increasing the ringdown time of the cavity, making probing the cavity more difficult and increasing the gate duration.

SUMMARY

We disclose a programmable quantum processor that can help in solving many mathematical problems and is uniquely suited for simulating quantum many-body Hamiltonians. In contrast to the limited connectivity of most existing quantum computing hardware, our quantum processor uses a common cavity mode to implement nonlocal gates between any pair of qubits in an array of qubits. These nonlocal gates allow for substantially reduced gate depth when implementing most quantum algorithms and many Hamiltonians in the era of Noisy Intermediate Scale Quantum (NISQ) technology. They also have the potential to reduce error correction thresholds and realize quantum codes otherwise precluded by the geometry of a system limited to local gates.

Our quantum computing architecture performs quantum computing across many local quantum processors. Our methods apply to a variety of platforms, including Rydberg atoms and trapped ions, where local processors have been demonstrated with high fidelity internal operations. A local processor can include one or more qubits in a register. The qubits in this qubit register store quantum information and can locally interact with each other and with one or more "network elements" that in turn couple to a cavity mode to communicate with each other.

Our architecture allows for any-to-any gates between register qubits in different local processors with a fidelity fundamentally limited only by local processor gate errors. It alleviates some outstanding challenges of some quantum computing methods, such as (1) the rearrangement of atoms in Rydberg arrays and (2) the speed increase of intercavity entanglement distribution through network element multiplexing.

In our architecture, each cavity mode supports coupling of a single pair of network elements at a time. Multiple modes of the same cavity and/or multiple cavities can be used to couple network element pairs simultaneously. Put differently, parallelizability can be introduced by coupling network elements via multiple modes of the same cavity or by overlapping the modes of multiple cavities, or by enacting local gates between subsets of the local processor array which are then connected via cavity modes. The scheme also facilitates faster gates between distinct, non-overlapping cavities, allowing for all-connected computation between distributed clusters of qubits.

Our architecture can be used to perform a method of quantum information processing with a cavity containing a first qubit register, a first network element, a second qubit register, and a second network element. This method comprises attempting to entangle the first network element with the second network element via a mode of the cavity. After this attempt, we determine whether the first network element is entangled with the second network element. In response to determining that the first network element is entangled with the second network element, we can enact a teleported quantum gate on the first qubit register and the second qubit register via the first network element and the second network element, e.g., with an error of less than $10^{-2}$.

The first and second network elements can be first and second atoms, respectively, or first and second trapped ions, respectively. The first and second qubit registers can be non-neighboring qubit registers in an array of qubit registers, in which case the first and second network elements are non-neighboring network elements in an array of network elements.

Attempting to entangle the first network element with the second network element can include causing the first network element to emit a first photon into the cavity mode and causing the second network element to absorb the first photon. Determining whether the first network element is entangled with the second network element can include measuring the second network element. Alternatively, determining whether the first network element is entangled with the second network element can include causing the second network element to emit a second photon in the cavity mode and absorbing the second photon by the third network element.

Enacting the teleported quantum gate may include performing a first local operation between the first qubit register and the first network element and performing a second local operation between the second qubit register and the second network element. Performing the first local operation can comprise enacting a Rydberg interaction or a Coulomb interaction between the first qubit register and the first network element. Before attempting to entangle the first network element with the second network element, the first qubit register can be trapped within a Rydberg blockade radius of the first network element, and the second qubit register can be trapped within the Rydberg blockade radius of the second network element. Alternatively, the first and second qubit registers can be trapped in respective ions chains that contain the first and second network elements, respectively.

Our architecture can also be used to in another inventive method of quantum information processing. This method includes deterministically establishing a Bell pair between the first network element and the second network element. Then local gates are enacted between the first network element and the first qubit register and between the second network element and the second qubit register. Next, the states of the first network element and the second network element are measured before enacting single-qubit gates on the first and second qubit registers based on the states of the first and second network elements.

Deterministically establishing the Bell pair between the first network element and the second network element via the mode of the cavity can include transmitting a photon from the first network element to the second network element through the cavity, absorbing the photon at a second network element, and measuring the second network element to have absorbed the photon to ensure that first network element and the second network element are projected into the Bell state.

Alternatively, deterministically establishing the Bell pair between the first network element and the second network element can include transmitting a photon from the first network element to the second network element via an optical fiber connecting a first cavity containing the first network element and the first qubit register and a second cavity containing the second network element and the second qubit register. The second network element absorbs the photon and is then measured to have absorbed the photon to ensure that first network element and the second network element are projected into the Bell state.

Another method of quantum information processing uses a first qubit register in a first cavity, a first network element in the first cavity, a first set of communication elements, a second qubit register in a second cavity, a second network element in the second cavity, and a second set of communication elements. A first communication element in the first set of communication elements is entangled with a second communication element in the second set of communication elements. A state of the first communication element is swapped with a state of the first network element using a mode of the first cavity. A state of the second communication element is swapped with a state of the second network element using a mode of the second cavity. And a teleported quantum gate is enacted between the first qubit register and the second qubit register via the first network element and the second network element.

The first network element, the second network element, the first set of communication elements, and the second set of communication elements can comprise atoms or trapped ions.

Swapping the state of the first communication element with the state of the first network element may include emitting a photon from the first communication element into the mode of the first cavity and absorbing the photon, by the first network element, from the mode of the first cavity; The first network element can be measured to determine whether the first communication element successfully swapped states with the first network element.

Enacting the teleported quantum gate may include performing a first local operation between the first qubit register and the first network element and performing a second local operation between the second qubit register and the second network element. If the first qubit register and the first network element are ions in a chain of trapped ions, the first local operation can comprise a Coulomb interaction between the first qubit register and the first network element. If the first qubit register and the first network element are trapped within a Rydberg blockade radius of each other, the first local operation can comprise a Rydberg interaction between the first qubit register and the first network element.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

FIGS. 8A-8E illustrate fast entanglement distribution between network elements in remote modules facilitated by many communication elements.

DETAILED DESCRIPTION

Nonlocal Gate Scheme

Figure 1A:
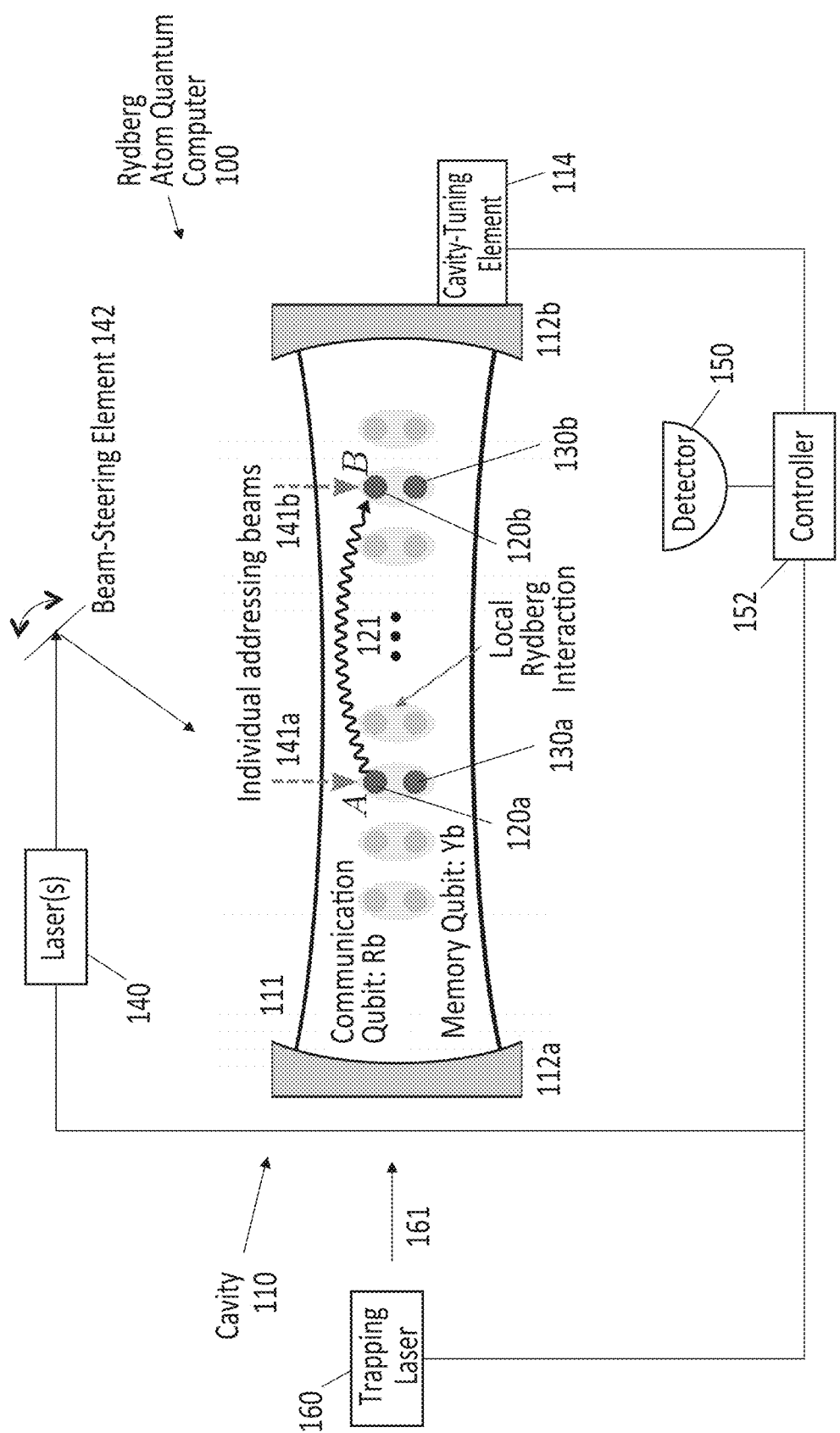
FIG. 1A shows an architecture for a quantum computer with Rydberg atoms trapped in a cavity to form an array of local processors, each of which includes a qubit register (memory qubit) for storing quantum information and a network element (communications qubit) for generating entanglement.

FIG. 1A shows a quantum computer 100 (also called a quantum processor) that performs all-connected, cavity-mediated quantum computing with an array of local quantum processors, also called local processors or nodes. Each local processor includes a network element 120 and a qubit register 130 (only local processors A and B, network elements 120a and 120b, and qubit registers 130a and 130b are labeled in FIG. 1A). In this example, the Rubidium atoms serving as network elements (communications qubits) 120 and Ytterbium atoms as qubit registers (memory qubits) 130. Other implementations of this type of quantum computer may use trapped ions instead of neutral atoms as explained below with respect to FIGS. 6A, 6B, and 7A-7D.

The network elements 120 and qubit registers 130 are trapped inside an optical cavity 100 formed by a pair of mirrors 112a and 112b (collectively, mirrors 112). In this example, a trapping laser 160 emits a beam 161 that is resonant with the cavity 100 and generates a standing wave lattice (not shown) that traps the network elements 120 and qubit registers 130. Typically, for neutral atoms, the trapping beam is red light detuned from the main ground-to-excited state transition for the network elements 120 to make sure the trapping light 120 itself does not excite the network elements 120 very much, if at all.

A cavity-tuning element 114, such as a piezo-electric actuator or heater, tunes the cavity resonance frequency by changing the optical path length between the mirrors 112 under the control of an electronic controller 152. The controller 152 also controls the trapping laser 160 and another laser 140 that mediates interactions among the local processors. This laser 140 emits addressing beams 141a and 141b, which are resonant with transitions of the network elements 120 and are directed to different network elements 120 with a beam-steering element 142, such as a galvo-scanning mirror or acousto-optic deflector. The beam-steering element 142 can also modulate the amplitudes and durations of the addressing beams 141a and 141b. The controller 152 is also coupled to a detector 150 that senses photons emitted by the network elements 120.

In the quantum computer 100 of FIG. 1A, the network elements 120a and 120b are coupled to a cavity mode 111 of the cavity 110 to allow the generation of nonlocal entanglement via the cavity mode 111. (Other network elements 120 can be coupled to each other via other cavity modes for multiplexed, parallel entanglements.) Because all of the network elements 120 can be coupled to the same cavity mode 111, then each network element 120 can be coupled to any other network element 120 by emitting photons into and absorbing photons from the cavity mode 111. More specifically, non-neighboring network elements 120 can be entangled by exchanging a photon via the cavity mode 111. In FIG. 1A, network elements 120a and 120b are entangled via a photon 121 that is released by network elements 120a into the cavity mode 111 and absorbed network element 120b. After successful entanglement distribution among network elements 120, local gates (e.g., Rydberg gates for Rydberg atoms or Coulomb gates for trapped ions) between the qubit register 130 and network atom 120 at each node (local processor) allow for teleported gates between qubit registers at different nodes. In FIG. 1A, the entanglement between network elements 120a and 120b allows for a teleported gate between the network element 120a and qubit register 130a at node A and the network element 120b and qubit register 130b at node B.

Figure 1B:
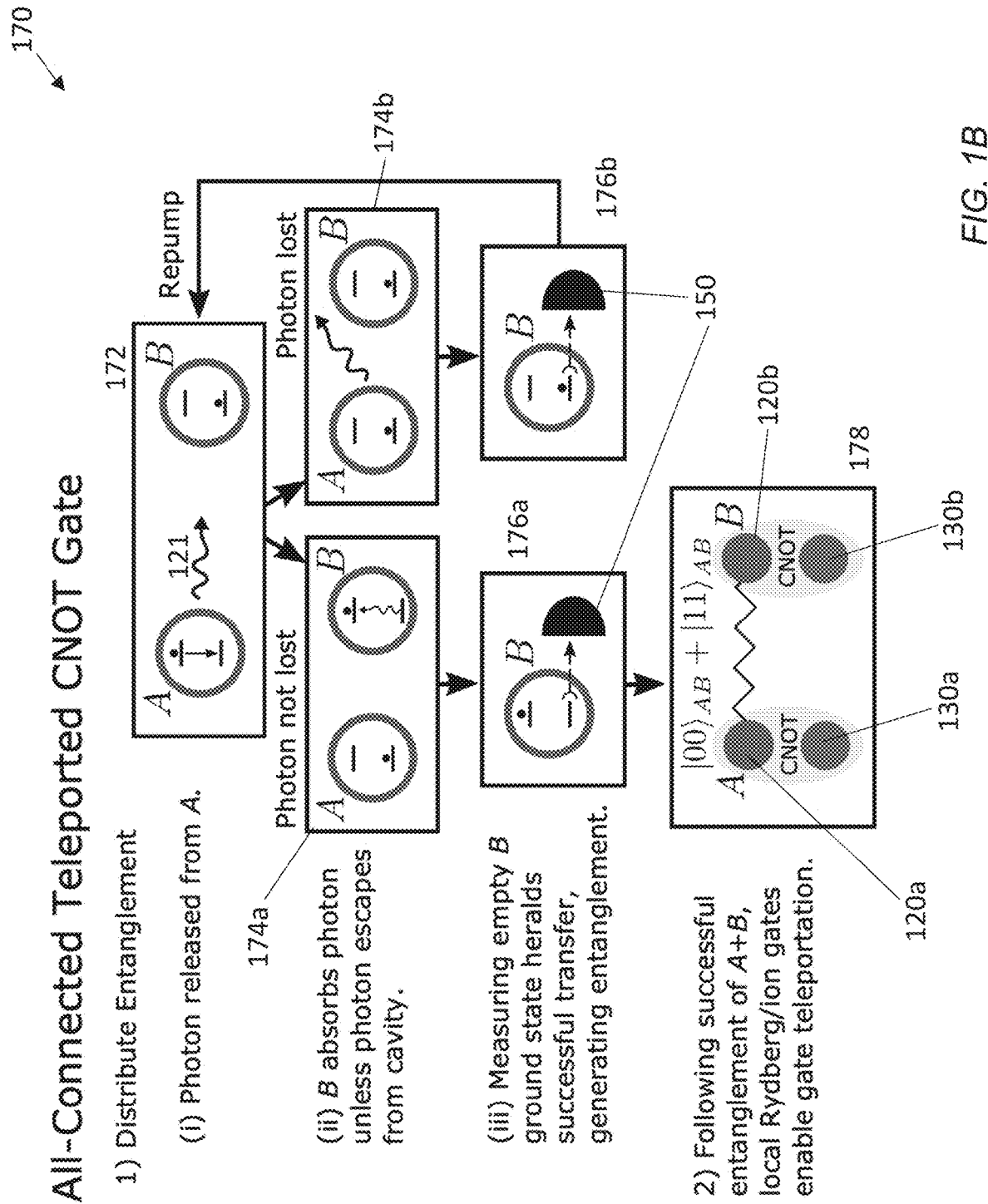
FIG. 1B shows a process for implementing an all-connected teleported controlled NOT (CNOT) gate in the quantum computer of FIG. 1A.

FIG. 1B illustrates a high-level process 170 for enacting a teleported gate (e.g., a CNOT gate) between local processors A and B in the quantum computer 100 of FIG. 1. This process 170 can be divided into two parts: (1) distributing entanglement among the network elements of the affected local processors; and (2) after successful entanglement, enacting local (Rydberg) gates to enable gate teleportation. In this example, entanglement is distributed among the network elements 120a and 120b of nodes A and B, respectively, by first releasing a photon 121 from network element 120a into the cavity mode 121 (172). The photon 121 is either absorbed by network element 120b (174a) or lost (174b), e.g., because it escapes the cavity 110. Next, the ground state of the network element 120b is measured to determine whether or not it has absorbed the photon 121 released by the other network element 120a. The entanglement protocol is described in greater detail below, with examples of the pulses used to cause the networks elements to emit and absorb photons.

If this heralding measurement indicates that the ground state is empty (176a), then the network element 120b absorbed the photon 121, and the network elements 120a and 120b have been entangled successfully (they are in a Bell state). At this point, the nodes A and B can carry out the local gates (178). If the measurement indicates that the ground state is populated (176b), then the network element 120b did not absorb the photon 121, and the network elements 120a and 120b were not entangled successfully. Entanglement can be attempted again by repumping or reinitializing the network elements 120a and 120b; here, placing network elements 120a and 120b back in their starting excited and ground states, respectively.

Figure 1C:
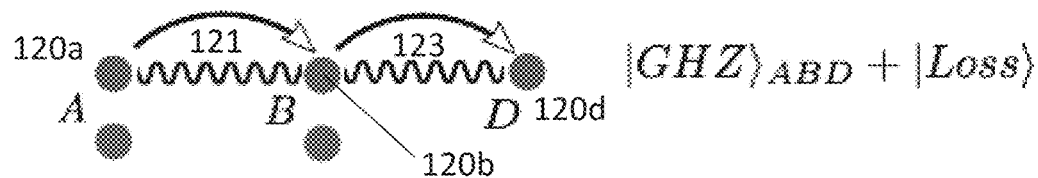
FIG. 1C illustrates a scheme for deterministic entanglement generation between network elements at nodes A and B using a separate network element in the quantum computer of FIG. 1A.
Figure 1C:
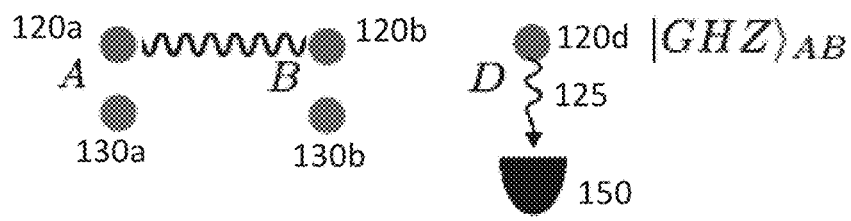
Figure 1D:
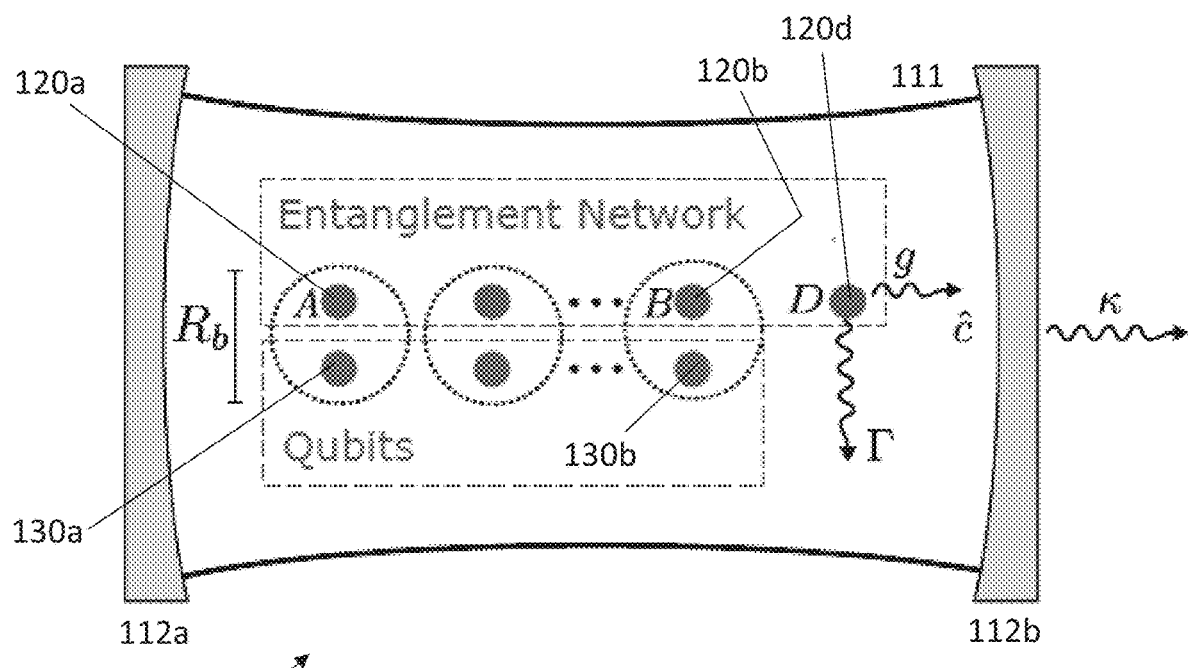
FIG. 1D shows the quantum computer of FIG. 1A used to implement an all-connected teleported CNOT gate between register qubits in two different local processors using a separate network element to verify entanglement.

FIGS. 1C and 1D illustrate an alternative process of entangling non-neighboring network atoms and of verifying that entanglement for enacting a teleported gate in the quantum computer 100. In this example, the quantum computer 100 executes a teleported CNOT gate across local processors A and B using a separate network element (here, network element 120d in local processor D) to verify entanglement. Using a separate network element to verify entanglement can make the readout process easier in terms of the level structure of the atom (network element) and by reducing the possibility of interfering with the entanglement at the cost of an additional (potentially lossy) photon transfer.

This process starts with deterministically establishing a Bell pair between the network elements 120a and 120b at nodes A and B. This can be done by passing a photon 121 from network element 120a to network element 120b through the (lossy) cavity 110, then passing a photon 123 from network element 120b to network element 120d through the same cavity mode 111 before measuring whether network atom 120d absorbed the photon 123. This measurement can be carried out by detecting fluorescence 125 from network element 120d. Absorption by network element 120d indicates, with a carefully designed protocol, that the photon was not lost due to cavity or atomic excited state decays, and the network atoms 120a and 120b at local processors A and B are projected into a Bell state. Errors due to scattering Γ off of the intermediate excited state |e⟩ and cavity losses K compete with the coupling rate g of a network atom to the cavity mode e to determine the average success probability per entanglement attempt.

If the network atoms 120a and 120b are in a Bell state, then the quantum processor 100 enacts a local (e.g., Rydberg or trapped ion Coulomb) CNOT gate between each entangled Bell state network element 120a, 120b and its corresponding processor register qubit 130a, 130b. The quantum processor 100 measures the states of network elements 120a and 120b. Based on the result of these measurements, the quantum processor 100 enacts respective single-qubit gates on the qubit registers 130a and 130b in nodes A and B. This measurement process could be accomplished by probing via the cavity mode 111 (for example, transmission probing or Purcell enhanced fluorescence) or by other readout techniques (such as free-space fluorescence imaging).

Figures 2A, 2B:
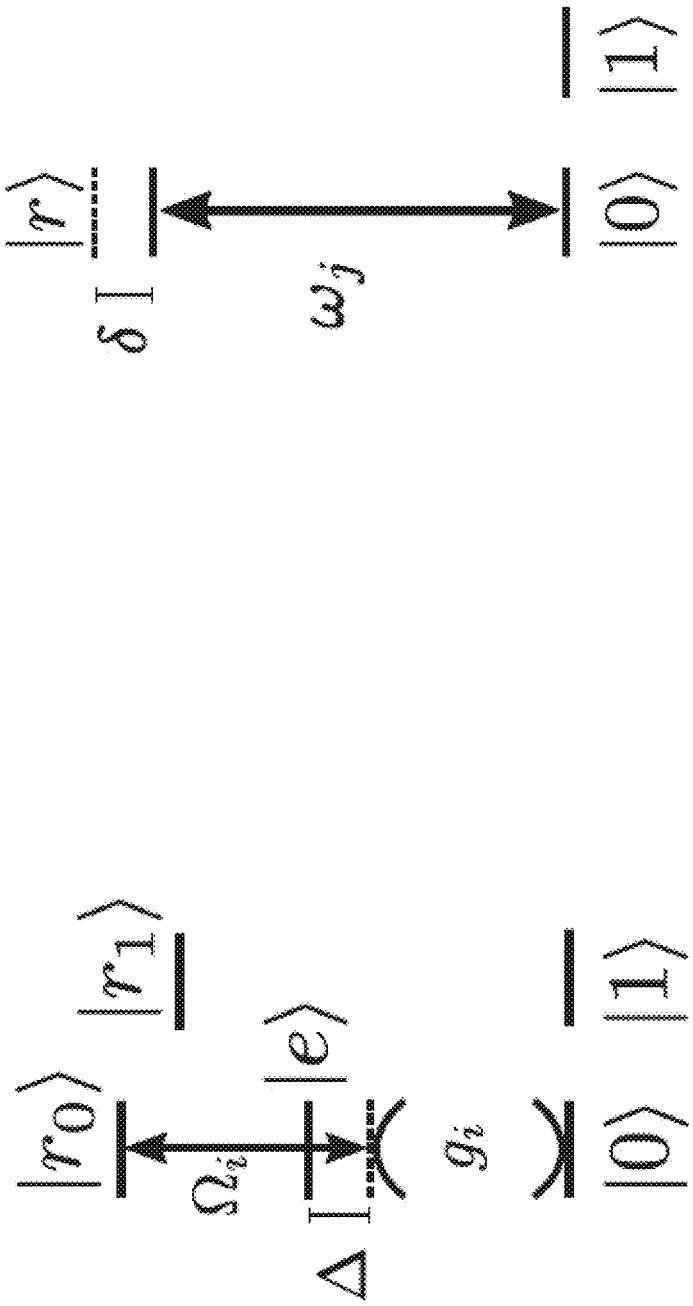
FIG. 2A shows an atomic level structure for a network atom at node i, coupled to the cavity with strength $g_i$ and with individual addressing beam $\Omega_i$ for an all-connected teleported gate.
FIG. 2B shows an atomic level structure for the qubit atom at node j with individual addressing beam $\omega_j$ for an all-connected teleported gate.

FIGS. 2A and 2B shows atomic level structures for network atoms (e.g., network element 120a) and qubit atoms (e.g., qubit register 130b), respectively, that are coupled to a cavity (e.g., cavity 110 in FIG. 1A). The network atom is coupled to the cavity with strength $g_i$ and with individual addressing beam $\Omega_i$ (e.g., laser beam 141a) for an all-connected teleported gate. The network atom can be rotated between ground states |0⟩ and |1⟩ and between Rydberg states $|r^0\rangle$ and $|r_1\rangle$. It also has an intermediate excited state |e⟩. The network atoms can be selectively raised to the Rydberg states, one of which can blockade a qubit atom, via a two-photon transition involving $\Omega_i$ and a global addressing beam. The qubit atom in FIG. 2B can tuned between ground and excited states an individual addressing beam $\omega_j$ (e.g., beam 141b) for an all-connected teleported gate. If the network atoms and qubit atoms are different species of atom, they can be addressed with laser beams at different wavelengths (e.g., generated by a single tunable laser or by two separate lasers).

Near-Deterministic Entanglement Distribution

As explained above, a Bell pair can be deterministically established between any two network elements at nodes A and B by transferring a photon between them and subsequently measuring the state of the network element at node B or transferring this photon to a third network element D for measurement to verify that the photon was not lost due to excited state scattering of the atoms or cavity decay. This scheme is robust against variations in the coupling strength to the cavity and can operate with identical or different coupling strengths at any of the nodes. The robustness against variations in coupling strength is especially useful for enacting gates between distant atoms within a spatially varying cavity mode envelope.

The process of deterministically establishing a Bell pair reduces or eliminates decoherence due to excited-state scattering of the atoms or cavity decay. To see why, assume that (1) the state |e⟩ decays at rate Γ, (2) the photon leaks out of the cavity at rate κ, (3) the lifetimes of the Rydberg states and the ground states are infinite, and (4) there are perfect atomic state readout and single-qubit operations as well as repeatable laser pulses (driving pulses Ω from the laser source(s) 140). In this case, the process allows perfect entanglement distribution.

As described here, the Rydberg blockade effect is not used to distribute entanglement. The quantum computer architecture in FIGS. 1A-1D uses the states $|r_0\rangle$ and $|r_1\rangle$, which are called Rydberg states here but could also be any other state that the excited state only would scatter weakly into, instead of a ground state to couple the cavity using a two-photon transition. Otherwise, a photon scattering off of the atomic intermediate state |e⟩ and landing back in the laser-coupled ground state (an error because the environment now knows the atomic state) could couple a photon into the cavity mode and a false positive by subsequent absorption at atom D.

Entanglement Protocol

The protocol to generate a Bell pair (e.g., as in FIGS. 1B-1D) begins in the following state, where at first the network elements other than those being entangled (here, the network elements at nodes A and B) are stored in state |1⟩ so they do not couple to the cavity mode:

$$|\Psi\rangle = (|r_0\rangle_A + |r_1\rangle_A)|0\rangle_B|1\rangle_D \qquad (1)$$

Then, a photon is transferred via the cavity mode from the network element at local processor A to the network element at local processor B. This transfer can be carried out using two-photon Raman π pulses with nonzero detuning Δ to release a photon from A and cause B to absorb the photon, or with small detuning Δ through a stimulated Raman adiabatic passage (STIRAP) dark state by ramping up $\Omega_A$ while ramping down $\Omega_B$, where $\Omega_A$ and $\Omega_B$ are the Rabi frequencies of the individual addressing beams 141a and 141b, respectively. During this transfer, the photon may leak out of the cavity or scatter off of the intermediate excited state of A or B. This gives $|r_0\rangle_A|0\rangle_B \to \alpha|0\rangle_A|r_0\rangle_B+\beta|\text{Loss}\rangle$, where $|\text{Loss}\rangle$ represents some state where the photon has scattered into a mode outside the cavity and the network element is left in some ground state:

$$|\Psi\rangle=(\alpha|0\rangle_A|r_0\rangle_B|1\rangle_D+\beta|\text{Loss}\rangle)+|r_1\rangle_A|0\rangle_B|1\rangle_D \quad (2)$$

($|\text{Loss}\rangle$ is a state where all the network elements are in some ground state and there is no photon in the cavity. Since the ground states are coupled only to the excited states by the cavity mode, once the system is in the state $|\text{Loss}\rangle$, nodes A, B, and D cannot evolve out of their ground states, so that a state $|\text{Loss}\rangle$ maps to a state $|\text{Loss}\rangle$ under any further operations.)

In order to repeat the transfer on the other component, the quantum computer swaps between the two Rydberg states on nodes A and B and swaps the two ground states on node A:

$$|\Psi\rangle=(\alpha|1\rangle_A|r_1\rangle_B|1\rangle_D+\beta|\text{Loss}\rangle)+|r_0\rangle_A|0\rangle_B|1\rangle_D \quad (3)$$

The quantum computer then executes a STIRAP that affects only the last term in Eq. (3), and assuming the cavity/excited-state losses are repeatable by using identical laser pulses, ramps $\Omega_A$ and $\Omega_B$ with the same profiles as before (so that a and for the losses here are the same as before):

$$|\Psi\rangle=(\alpha|1\rangle_A|r_1\rangle_B|1\rangle_D+\beta|\text{Loss}\rangle)+(\alpha|0\rangle_A|r_0\rangle_B$$
$$|1\rangle_D+\beta|\text{Loss}\rangle)$$

A and B are now entangled. At this point, we could probe network element B and verify that it is not in a ground state to check that the entanglement was successful, leaving A and B in a Bell state, or we could further transfer the photon from B to D as described above, and measure network element D. This optional additional transfer from B to D can be used to extend the entanglement to D and beyond through a series of sequential transfers to an arbitrary number of network elements.

The quantum processor then moves $|1\rangle_D \to |0\rangle_D$ so that D couples to the cavity and further entangles B and D in the exact same way, i.e., via STIRAP through the cavity mode by ramping $\Omega_B$ and $\Omega_D$ to map $|r_0\rangle_B|0\rangle_D \to \gamma|0\rangle_B |r_0\rangle_D+\sigma|\text{Loss}\rangle$ (the loss fraction during the B→D transfer may be different than the A→B transfer due to different coupling strengths):

$$|\Psi\rangle=(\alpha|1\rangle_A|r_1\rangle_B|0\rangle_D+\beta|\text{Loss}\rangle)+(\alpha|0\rangle_A(\gamma|0\rangle_B$$
$$|r_0\rangle_D+\sigma|\text{Loss}\rangle)+\beta|\text{Loss}\rangle)$$

Again, the quantum processor exchanges the Rydberg states on B and on D, and the ground states on B:

$$|\Psi\rangle=(\alpha|1\rangle_A|r_0\rangle_B|0\rangle_D+\beta|\text{Loss}\rangle)+(\alpha|0\rangle_A(\gamma|1\rangle_B$$
$$|r_1\rangle_D+\sigma|\text{Loss}\rangle)+\beta|\text{Loss}\rangle)$$

Executing the final identical STIRAP $|r_0\rangle_B|0\rangle_D \to \gamma|0\rangle_B|r_0\rangle_D+\sigma|\text{Loss}\rangle$ from B to D with identical laser pulses gives:

$$|\Psi\rangle=(\alpha|1\rangle_A(\gamma|0\rangle_B|r_0\rangle_D+\sigma|\text{Loss}\rangle)+\beta|\text{Loss}\rangle)+$$
$$(\alpha|0\rangle_A(\gamma|1\rangle_B|r_1\rangle_D+\sigma|\text{Loss}\rangle)+|\text{Loss}\rangle)$$

After swapping $|0\rangle_A$ and $|1\rangle_A$ this becomes:

$$|\Psi\rangle=\alpha\gamma|0\rangle_A|0\rangle_B|r_0\rangle_D+|1\rangle_A|1\rangle_B|r_1\rangle_D)+\alpha\sigma|$$
$$\text{Loss}\rangle+\beta|\text{Loss}\rangle)+\gamma\sigma|\text{Loss}\rangle+\beta|\text{Loss}\rangle)$$

At this point, A, B, and D are entangled with each other. Applying a π/2 pulse on the Rydberg states of D gives:

$$|\Psi\rangle=\alpha\gamma|0\rangle_A|0\rangle_B+|1\rangle_A|1\rangle_B|r_0\rangle_B+\alpha\gamma|0\rangle_A|0\rangle_B-|$$
$$1\rangle_A|1\rangle_B|r_1\rangle_D+\alpha\sigma|\text{Loss}\rangle+\beta|\text{Loss}\rangle)+\gamma\sigma|$$
$$\text{Loss}\rangle+\beta|\text{Loss}\rangle)$$

Finally, the quantum processor measures whether D is in $|r_0\rangle_D$, in $|r_1\rangle_D$, or in neither state. If neither, the quantum processor restarts the procedure. If measured in $|r_0\rangle_D$, A and B are in the Bell state $|0\rangle_A|0\rangle_B+|1\rangle_A|1\rangle_B$ or if measured in $|r_1\rangle_D$, A and B are projected into the Bell state $|0\rangle_A|0\rangle_B-|1\rangle_A|1\rangle_B$.

The possibility of backscattering out of the state $|e\rangle$ during this sequence allows a small chance for an error. If using Rydberg states, this error should be about $10^{-3}$ for gate times of about 10 μs, Rydberg decay timescales down to fast-decaying excited states of about 1 ms, and alkali atoms where the excited state $|e\rangle$ is one state in a manifold of about 20 states. This error can be suppressed to zero by using another ground state combined with a microwave transition instead of the Rydberg state for the two-photon coupling, where the backscattering into the laser-coupled ground state is then forbidden by selection rules.

Fast State Readout by Probing Cavity Transmission

The cavity allows for communication between distant qubit registers and also enables fast, high-fidelity qubit readout. By coupling just one of an atom's ground states $|0\rangle$ or $|1\rangle$ to an excited state via the cavity mode, the internal quantum state of the atom can then determine a shift of the cavity mode frequency as measured by the transmission of a probe beam incident on a cavity mirror. This readout process can be used to read out an atom acting as a network element (a network atom), e.g., for verifying entanglement as in the entanglement protocols described above. It can also be used to read out an atom acting as a qubit register (a qubit or memory atom) by first entangling the qubit atom with its corresponding network atom using a local Rydberg CNOT gate, then reading out the network atom.

Figure 3:
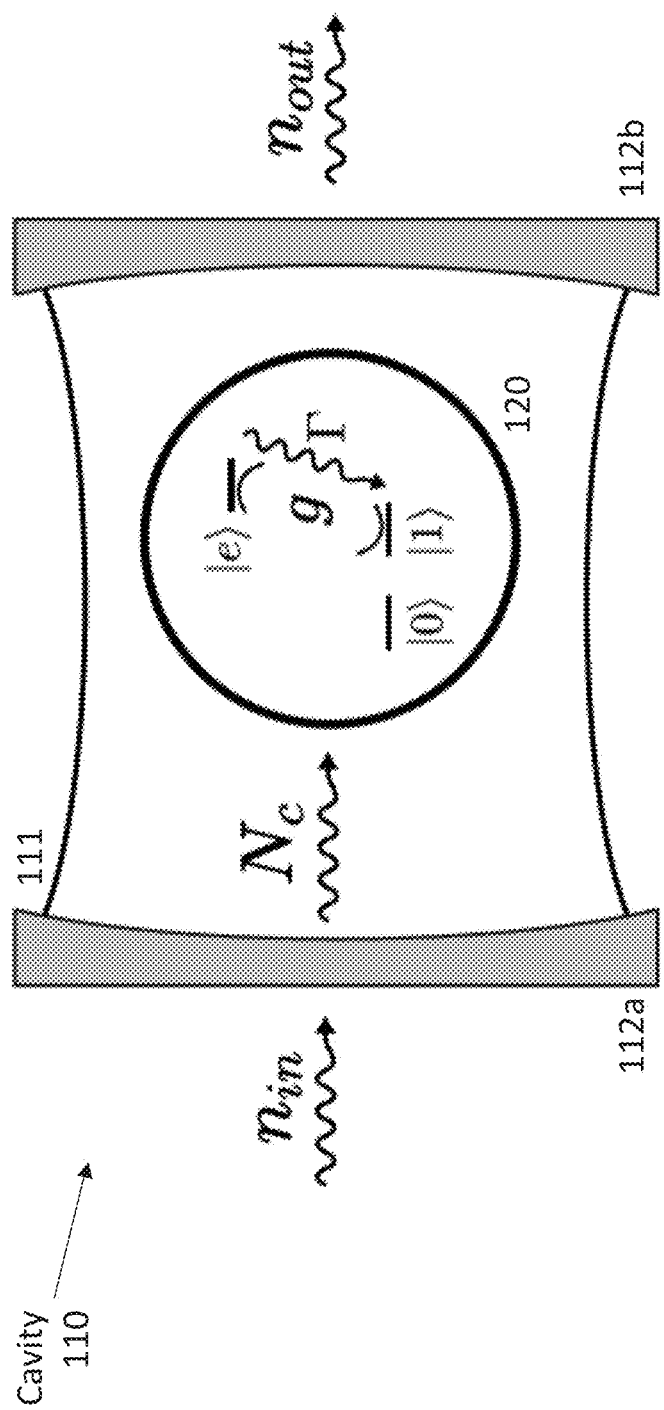
FIG. 3 illustrates ultrafast readout of single atom coupled to a cavity mode, e.g., for verifying entanglement of one network element with another network element.

FIG. 3 illustrates the fast, high-fidelity readout of an atom by probing the transmission of the cavity. In FIG. 3, $n_{in}$ is the rate of photons incident on the cavity, $n_{out}$ is the rate of photons propagating through the cavity, and N, is the steady state average photon number in the cavity mode. One of the logical ground states of the atom is resonantly coupled to the cavity mode 111, and the cavity 110 is probed with resonant light. If the atom is in state $|0\rangle$, the cavity 110 fully transmits the photons with $n_{out}=n_{in}$. If the atom is in state $|1\rangle$, then the atom couples up to intermediate excited state $|e\rangle$ and scatters light from the cavity mode 111 transversely, preventing power from building up in the cavity mode 111 and resulting in $n_{out} \ll n_{in}$. A nearly closed transition where $|e\rangle$ decays back only to $|1\rangle$ allows near perfect discrimination of the ground states.

The following more detailed explanation of the fast readout process shown in FIG. 3 may be helpful. In the low saturation limit, the transmission probability for a probe photon on resonance with a cavity of cooperativity $C=g^2/\kappa\Gamma$ coupled resonantly to a two-level atom with excited state linewidth Γ with a cavity-atom detuning of δ is:

$$|T|^2 = \frac{1}{1+4C} \to \frac{1}{16}\frac{1}{C^2}.$$

The photon transmission probability is $|T|^2=1$ when the atom is uncoupled, so a moderate cooperativity cavity (C~10) offers excellent transmission contrast between the uncoupled ($|0\rangle$) and coupled ($|1\rangle$) states.

For cavities with realistic parameters similar to those useful for implementing in a teleported CNOT gate, it is possible to remain in the low saturation limit even when probing with a fast, many-photon coherent pulse, allowing high-fidelity discrimination between logical ground states on microsecond or sub-microsecond timescales.

When a coherent laser beam drives a two-level atom, the atom re-scatters a small fraction of the light which interferes with the drive beam, resulting in a net phase shift or attenuation of the drive beam. Using the optical Bloch equations allows the extraction of the atomic dipole moment and polarization while accounting for saturation of the two-level system, leading to a steady-state nonlinear susceptibility and propagation equation for the electric field:

$$\frac{\partial E}{\partial z} = -k\frac{3}{8\pi^2}\frac{N}{V}\lambda^3\frac{\Gamma}{\Gamma/2 - i\delta}\frac{\Gamma}{\Gamma + 2R_{opt}}E,$$

where $R_{opt}=\Omega^2\Gamma[(\Gamma/2)^2+\delta^2]$ grows with the strength of the drive field, representing the nonlinearity. Here, the atom is driven with a detuning $\delta \ll \Gamma$ so that $\partial E/\partial z$ is approximately real and purely attenuating with no phase shift.

For a Gaussian cavity mode with a waist w, length L, and mode volume $V=\pi w^2 L/4$, this results in a fractional electric field attenuation due to a single atom (N=1) per pass of:

$$-\beta = \frac{\Delta E}{E} \approx -\frac{6}{\pi^2}\frac{\lambda^2}{w^2}\frac{1}{1+\frac{8\Omega^2}{\Gamma^2}}.$$

To avoid saturation, $8\Omega^2/\Gamma^2 < 1$. Expressing this condition in terms of the average photon number in the cavity $N_c$, $N_c < \Gamma^2/8g^2$ since $\Omega=\sqrt{N_c}g$.

For a cavity containing an attenuator $\alpha=1-\beta$ (so that $E\to\alpha E$ with $\alpha<1$ when transmitted through the attenuator), the electric field $E_c$ circulating in the cavity can be expressed in terms of the input electric field strength $E_{in}$:

$$\frac{E_c}{E_{in}} = \frac{t}{1 - r^2\alpha^2} \approx \frac{t}{2\beta}$$

$$\frac{E_{out}}{E_{in}} = \frac{\alpha t^2}{1 - r^2\alpha^2} \approx \frac{t^2}{2\beta}$$

assuming that $\beta \gg t^2$ for strong transmission contrast.

This leads to an expression relating the average rate of photon transmission $n_{out}$ to the rate if incident photons in the coherent probe beam $n_{in}$:

$$\frac{n_{out}}{n_{in}} = \frac{E_{out}^2}{E_{in}^2} \approx \frac{1}{4}\left(\frac{t^2}{\beta}\right)^2$$

With photons leaking out of the cavity at rate $\kappa$ and since $n_{out}=\frac{1}{2}\kappa N_c$, the average photon number in the cavity mode $N_c$ is:

$$N_c = \frac{1}{2}\frac{n_{in}}{\kappa}\left(\frac{t^2}{\beta}\right)^2.$$

Even when the rate of incident photons is comparable to the cavity lifetime, $N_c$ is suppressed well below 1 because the attenuating atom prevents power building up in the cavity. This effect makes it easy for the atom to stay in the linear regime even when the incident photon rate is greater than the cavity lifetime.

For the atom to remain in the linear regime, the incident photon rate should be less than:

$$n_{in} < \frac{1}{4}\frac{\Gamma^2}{g^2}\left(\frac{\beta}{t^2}\right)^2\kappa.$$

The fidelity of this process when probing with a coherent state is limited by two processes: (1) shot noise and (2) an imperfect closed transition between the ground state $|1\rangle$ and the intermediate excited state $|e\rangle$. To operate above the shot noise limit, a coherent state should contain enough photons to distinguish the Poisson distribution of the fully transmitted coherent state from the extinguished coherent state. On the other hand, when the atom is coupled, a small fraction $p_{scat}=\frac{1}{2}C$ of the incident photons scatter off of the atomic excited state. With the cavity coupling to a completely closed transition, this scattering leads to no additional errors, but with an imperfect closed transition, the atom may scatter into a ground state other than $|1\rangle$ with probability $p_{im}$ so that subsequent photons are readily transmitted instead of blocked. Because the probability of finding few photons in a many-photon coherent state is exponentially suppressed with the coherent state average photon number, the total detector error may be almost entirely determined by the imperfection in the closed transition.

An atom coupled to a cavity with a moderate cooperativity C=30, a cavity ringdown time of $\tau=3$ μs, and a waist w=10 μm can be read out with the laser pulses and timescales with the following parameters. Sending a coherent laser pulse with a profile varying on the timescale of with these parameters corresponds to a photon transmission probability of $p_0 \sim 1$ for the uncoupled state $|0\rangle$ and $p_1 \sim 10^{-4}$ for the coupled state $|1\rangle$. These parameters should allow atomic state readout with a fidelity better than $10^{-3}$ within a timescale of i, since, with around a 10-photon coherent pulse, the probability of zero photons transmitting in the uncoupled case is $e^{-10} \sim 10^{-4}$ and the probability of transmitting any photons in the coupled case is $10p_1 \sim 10^{-3}$. The probability of any of the 10 photons in the coherent pulse causing the atom to scatter out of the ground state $|1\rangle$ during the probing is around $10 \times p_{scat} \times p_{im} = 10 \times (1/60) \times 10^{-3} \sim 5 \times 10^{-4}$.

The atom should be in the linear regime with a 10-photon coherent pulse within a time T. The atom should remain in the linear regime so long as $n_{in} < 10^4\kappa$, so sending photons at a rate of $10\kappa$ is safely still in the linear regime. It should be possible to stay in the linear regime while using a more intense beam (i.e., more photons per coherent pulse). This would allow for probing with a pulse on a timescale $\Delta t$ shorter than $\tau$ in exchange for allowing the uncoupled transmission probability to fall from ~1 to ~$\tau/\Delta t$ since the cavity would only transmit the frequency components of the pulse within the cavity linewidth $\kappa=1/\tau$.

Figures 4A, 4B:
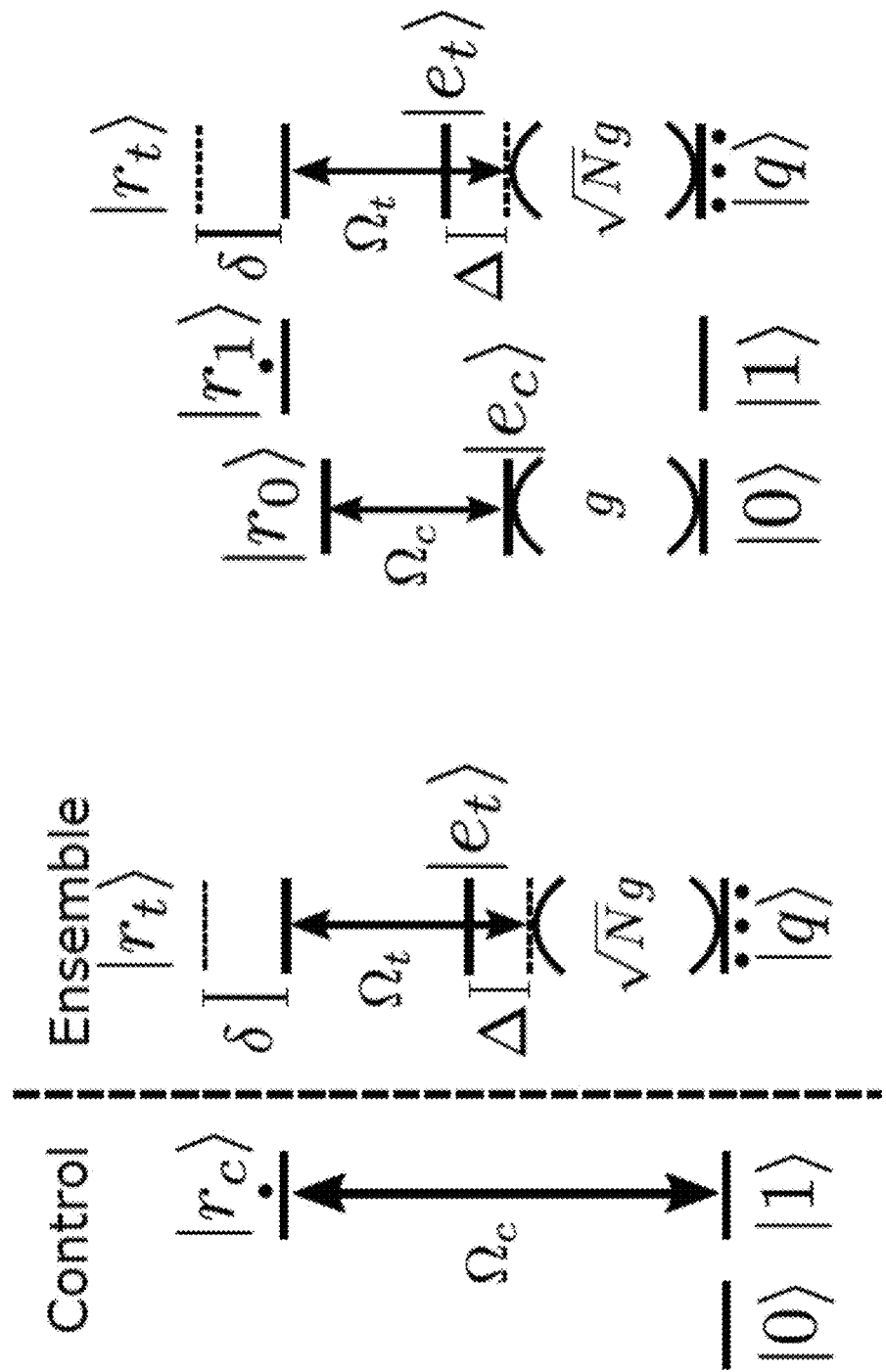
FIGS. 4A and 4B illustrate read out of the control qubit by inducing a state-dependent blockade shift of a separate atomic ensemble, bringing the ensemble atoms out of resonance with the cavity mode to affect the cavity transmission.

Fast State Readout by Rydberg-Controlled Ensemble-Enhanced Cavity Mode Shifts FIGS. 4A and 4B illustrate an alternative method for reading out network element and qubit registers atoms in which ensembles of network atoms can be added within the mutual network/qubit atom blockade radius at each node (local processor). This read-out method can be carried out at microsecond speeds.

In FIG. 4A, a single control atom blockades a distinct target ensemble of atoms. N ensemble atoms in a reservoir state $|q\rangle$ are coupled to a Rydberg state $|r_r\rangle$ via a two-photon transition involving the collectively enhanced cavity coupling $\sqrt{N}g$. The Rydberg state $|r_c\rangle$ blockades $|r_r\rangle$ to state-selectively shift $|r_r\rangle$ out of resonance with the ensemble cavity.

To understand the function of a separate network element that is used to verify entanglement of two other network elements (e.g., the detector network element 120d in FIGS. 1C and 1D), consider a control qubit which blockades a distinct atomic ensemble as in FIG. 4A with blockade shift $\delta$. The cavity is tuned into resonance with the Rydberg state of the ensemble atoms via a two-photon transition. Moving the control qubit into the Rydberg state $|r_c\rangle$ then effectively switches off the coupling of the ensemble to the cavity by moving the ensemble Rydberg state $|r_r\rangle$ far off resonance. This substantially changes the transmission of the cavity when probed with resonant light.

The amplitude transmission function for light on resonance with a cavity of cooperativity $C=g^2/\kappa\Gamma$ coupled to N two-level atoms with excited state linewidth $\Gamma$ with a cavity-atom detuning of $\delta$ is:

$$T(\delta) = \cfrac{1}{1 + \cfrac{4NC}{1 + 4\delta^2/\Gamma^2} + 8i\cfrac{NC\delta/\Gamma}{1 + 4\delta^2/\Gamma^2}}.$$

This formula holds in the low saturation limit, where the number of probing photons is less than the number of atoms N in the ensemble. To selectively couple only the ensemble at a given node to the cavity, the cavity couples to the atoms through a two-photon transition of strength $g\Omega_r/\Delta$ up to a Rydberg state of linewidth $\Gamma_r$ with a detuning of $\delta$ from the two-photon resonance, as shown in FIG. 4A. Assume far detuning from the intermediate excited state; however, the intermediate excited state is slightly admixed into the Rydberg state, leading to a total effective decay of the Rydberg state $\Gamma'=\Gamma_r+\Gamma_e\Omega_r^2/\Delta^2$. $C=(g\Omega_r/\Delta)^2/(\kappa\Gamma')$ is the single atom cooperativity (where g in the cooperativity is replaced with the two-photon Raman Rabi frequency if two-photon excitation is used). If the excited-state decay rate is much larger than $\Gamma_r$, the decay rate of the Rydberg state may be dominated by the amount of excited state admixed into the Rydberg state: $\Gamma_e\Omega_r^2/\Delta^2$, in which case C reduces to the normal ground-to-excited-state coupled cooperativity: $C=(g\Omega_r/\Delta)^2/(\kappa\Gamma_e\Omega_r^2/\Delta^2)=g^2/\kappa\Gamma_e$. Reasonable parameters for typical Rydberg blockades, Rydberg decay rates, and moderate cooperativity cavities with N~100 give that $\delta \gg \Gamma'$ as well as the hierarchy $\delta/\Gamma' \gg NC \gg 1$.

Thus, when the control does not blockade the ensemble, $\delta = 0$ and the transmission probability is:

$$|T(\delta=0)|^2 = \left|\frac{1}{1+4NC}\right|^2 \approx 0$$

When the control does blockade the ensemble with $\delta \gg \Gamma'$ and $\delta/\Gamma' \gg NC$, the transmission probability is:

$$|T(\delta)|^2 \approx \left|\frac{1}{1+i\frac{2NC}{\delta/\Gamma'}}\right|^2 \approx 1 - \frac{N^2C^2}{\delta^2/\Gamma'^2} \approx 1$$

so that $|T(\delta)|^2$ is close to 1 ($\delta/\Gamma' \approx 10^4$, so $N^2C^2/(B^2/\Gamma'^2) \approx 10^4/10^8 = 10^{-4}$). For large $NC \gg \delta/\Gamma'$, the contrast ratio saturates to $|T(\delta)|^2/|T(\delta=0)|^2 \rightarrow \delta^2/\Gamma'^2$, so that the blockade shift to Rydberg decay rate ratio $\delta/\Gamma'$ gives a natural figure of merit for the quality of the Rydberg effect in this case.

Reasonable parameter values of $C \approx 1$, $N \approx 100$, $\Omega_r/\Delta = 0.1$ and $\Gamma_e = 10$ MHz such that $\Gamma' \approx 0.1$ MHz, and $\delta = 100$ MHz correspond to $|T(\delta=0)|^2 \approx 10^{-5}$ and $|T(\delta)|^2 \approx 1-10^{-2}$, giving near total contrast of transmission between the blockaded and unblockaded cases.

The extreme contrast allows the cavity to be probed with a many-photon coherent-state pulse on a short timescale with frequency width broader than the cavity linewidth K. Sending a probe pulse on a timescale shorter than the cavity ringdown time $\tau \sim 1$ μs should be compatible with maintaining high contrast so long as the spectral bandwidth of the pulse is narrower than the vacuum Rabi splitting shift of the cavity resonance $\sqrt{N}g\Omega_r/\Delta$. With $N=100$, $\Omega_r/\Delta = 0.1$, and $g=1$ MHz, that corresponds to a pulse of duration ~0.2 μs. Loading many photons into the coherent pulse then allows the high contrast signal to be well sampled even without waiting for a full ring up time of the cavity.

The error associated with qubit readout using this method should be limited only by the control atom's Rydberg decay during the cavity transmission. For the parameters given immediately above, the error is about $10^{-3}$ for typical Rydberg lifetimes of several hundred microseconds and sub-microsecond probe durations. It could be even smaller with higher NC.

FIG. 4B shows how the Rydberg state of a single incoherent excitation within an ensemble can be measured in the same manner. Instead of measuring the state of a control atom with a separately controlled ensemble as in FIG. 4A, the control is incorporated into the ensemble itself as a single incoherent excitation. N atoms are in a reservoir state $|q\rangle$ and a single atom from the ensemble (which does not need to be a coherent atomic excitation or W state) couples to the cavity to distribute entanglement. Here, the state $|r_1\rangle$ blockades $|r_r\rangle$.

Rydberg Atom Pairs as Local Processors

The quantum processor 100 of FIG. 1A can be implemented with $^{87}$Rb entanglement distribution network atoms and single $^{171}$Yb qubits atoms in an optical cavity with a laser that illuminates the network atoms with coherent pulses at a wavelength of 780 nm. For $^{87}$Rb atoms, $|5S_{1/2}$, $F=2$, $m_F=0\rangle$ and $|5S_{1/2}$, $F=1$, $m_F=0\rangle$ are the $|0\rangle$ and $|1\rangle$ states and the cavity at 780 nm couples $|5S_{1/2}$, $F=2$, $m_F=0\rangle$ up to $|e\rangle=|5P_{3/2}$, $F=3$, $m_F=0\rangle$. For readout of a network element (communications qubit), the quantum processor transfers one of the network logical states to $|5S_{1/2}$, $F=2$, $m_F=2\rangle$ and couples up to $|e\rangle=|5P_{3/2}$, $F=3$, $m_F=3\rangle$ to form the cycling transition for readout. For the qubit registers (memory qubits), the logical states can be the metastable nuclear spin states $|^3P_0$, $m_F=\pm\frac{1}{2}\rangle$ (natural lifetime 22.6 s), from which the Rydberg states are accessible via a single-photon transition. The cavity has a length L=2 cm and finesse F=141,000 for a ringdown time $\tau=3$ μs and cavity linewidth $\kappa=\pi c/LF=0.33$ μs$^{-1}=2\pi\times53$ kHz.

The quantum processor uses a Gaussian mode of the optical cavity with a mode profile $U(r,z)=e^{-r^2/w^2}\sin(kz)$, mode volume $V=\int dx^3 |U(r,z)|^2 = \pi w^2 L/4$, and coupling strength $g=\mu\sqrt{\omega_0/2\epsilon_0 \hbar V}=2.8$ MHz. $\mu=\sqrt{3/10}\times 4.2 ea_0$ is the dipole matrix element which we take between $|F=2, m_F=0\rangle$ and $|F=3, m_F=0\rangle$. Using the parameters above gives a Rayleigh range of $z_R=403$ μm and a distance of 6 μm axially before the mode amplitude has fallen by a factor of $1/\sqrt{2}$.

Simulating the STIRAP transfer efficiency for a single atom coupled to this cavity mode using Gaussian pulse shapes for $\Omega_A$ and $\Omega_B$ shows a successful transfer probability of 0.70 over 2 μs. The probability for two successful transfers in sequence is then 0.50, so that the average total time spent transferring (four transfers) is $2\times 4\times 2$ μs=16 μs. The total average gate time is then ~20 μs when adding in time for cavity probing measurements and single qubit rotations.

With a 2.6 μm spacing between sites, this allows 150 qubits in a one-dimensional (1D) chain along the cavity mode axis within $\pm z_R$ assuming no rearrangements and 50% qubit filling (300 qubits with rearrangement). One more row of qubits to each side of the axis could easily fit in a rectangular lattice within the 6 μm before the mode function falls of by $1/\sqrt{2}$ radially for a total of ~450/900 qubits without/with rearrangement. With rows in a triangular pattern with 2.6 μm lattice spacing, the cavity could fit five total rows of atoms with no atoms more than 3.7 μm radially distant from the mode axis, for a total of ~750/1500 qubits without/with rearrangement.

In addition to two-qubit gate errors, it is also worth considering qubit storage errors, especially given the lack of parallelizability when using a single cavity mode as a bus. The exceptionally long coherence times of neutral atom ground states means that even with gates executed in sequence instead of in parallel, gate errors can still dominate storage errors for high numbers of qubits. The $^{171}$Yb nuclear spin states are very insensitive to fluctuating external magnetic fields (typical laboratory magnetic fields fluctuate ~1 milligauss at frequencies <1 Hz, which can be thought of a small random magnetic field offset which drifts from shot to shot of the experiment). Through spin echo (occasionally swapping $|0\rangle$ and $|1\rangle$ reversals of the phase accumulated by the magnetic field offset), the qubit lifetime may be limited by the 22.6-second natural lifetime. In this example quantum processor, during a two-qubit gate taking T=20 μs, the probability for a qubit storage error among the N qubits is $NT/\tau$ ($10^{-3}$ for N=1000, $10^{-4}$ for N=100).

Trapped Ion Chains as Local Processors

An inventive quantum computer can also be implemented with trapped ion chains. Interactions via Coulomb force can hold a set of trapped ions in a chain using well-understood trapping techniques. The ions in each linear trap mutually repel each other due to the Coulomb interaction and can interact with each other via the Coulomb interaction. Within a chain of trapped ions, any ion can interact with any other ion due to this motional bus. However, building single linear chains longer than a few tens of atoms has proven difficult, since gate speed and fidelity is compromised with larger numbers in the same chain.

Figure 5A:
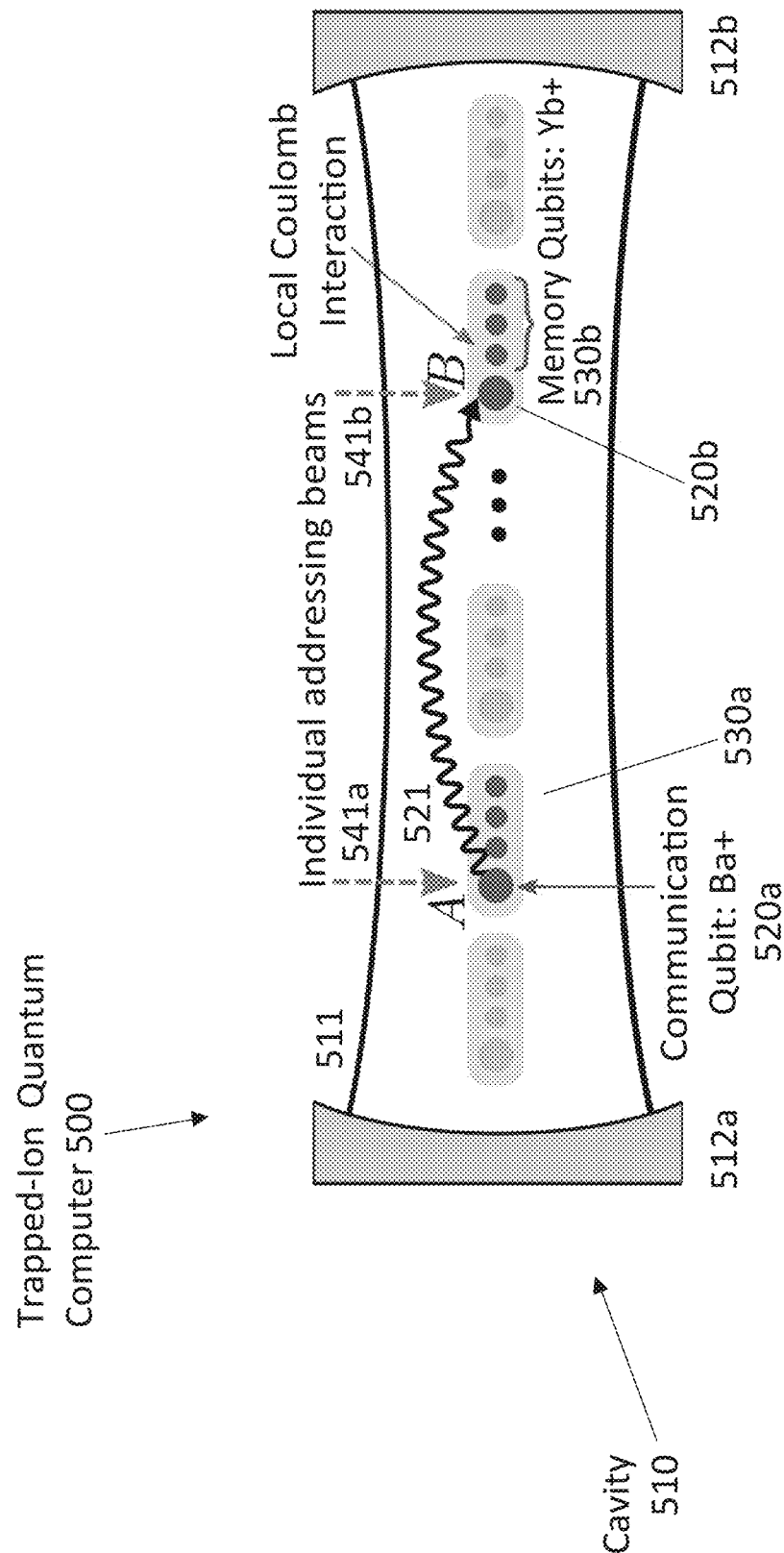
FIG. 5A shows a quantum computer with local processors formed of trapped ion chains.

FIG. 5A shows a quantum computer 500 that uses linear ion chains trapped in an optical cavity 510 (e.g., formed by mirrors 512a and 512b) as local processors. The ions can be trapped in the cavity 510 with radio-frequency Pauli traps generated using electrodes under the cavity mode and driven with alternating current to hold the ions within a cavity mode 511. As in the quantum computer 100 of FIG. 1A, each local processor includes a corresponding network element 520 (communications qubits, e.g., a first ion or set of ions in a trapped ion chain) and qubit register 530 (memory qubits, e.g., the other ions in the trapped ion chain). The network element ions 520 communicate with each other via the cavity mode 511 by exchanging photons. In this example, network element 520a transmits a photon 521 to network element 520b via the cavity mode 511 for enacting a teleported quantum gate as described above. The qubit register ions 530 communicate with their corresponding network element ions 520 through shared motion via Coulomb gates (such as Cirac Zoller or Molmer Sorensen gates) within each ion chain. (Laser(s), detector(s), and electronic components are omitted from FIG. 5A for clarity but be the same as or similar to those shown in FIG. 1A.)

Each linear ion chain could include a few dozen ions of Yb$^+$ as qubit registers 530 that do not couple to the cavity mode 511, along with one or more Ba$^+$ ions that do couple to the cavity mode 511 as network elements 520. Each of the ion chains could be trapped within the cavity mode 511, and the Ba$^+$ ions in each chain could interact via the cavity mode 511. Any two Ba+ ions on different chains could exchange photons and herald entanglement between each other via the cavity mode 511. Once entanglement has been heralded, each of the Ba$^+$ ions could then interact with a Yb$^+$ register qubit in the corresponding registers to realize a teleported CNOT gate between Yb$^+$ qubits in different qubit registers 530.

Figure 5B:
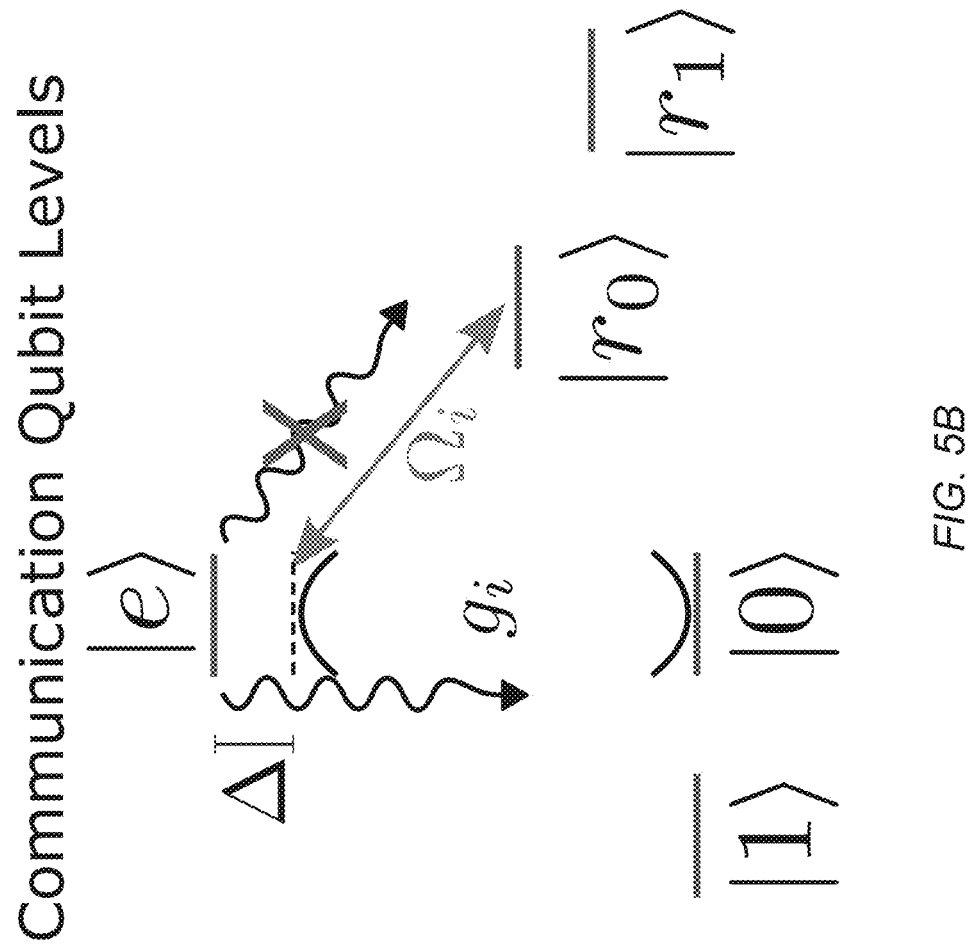
FIG. 5B shows a possible level structure for the network elements for the trapped-ion quantum computer of FIG. 5A.

FIG. 5B shows an energy level diagram for a $^{137}$Ba$^+$ isotope with nuclear spin I=3/2 operating as a communications qubit (network element 520). The states $|0\rangle$ and $|1\rangle$ in FIG. 5B correspond to the clock states $|F=2, m_F=0\rangle$ and $|F=1, m_F=0\rangle$ in the $6S_{1/2}$ ground state manifold, and the states $|r_0\rangle$ and $|r_1\rangle$ correspond to $|F=2, m_F=0\rangle$ and $|F=0, m_F=0\rangle$ in the $5D_{3/2}$ low- lying D state manifold, and the excited state $|e\rangle$ is the state $|F=3, m_F=0\rangle$ in $6P_{3/2}$, such that rotations between $|0\rangle$ and $|1\rangle$ and between $|r_0\rangle$ and $|r_1\rangle$ can be driven via Raman transitions. The states $|r_0\rangle$ and $|r_1\rangle$ in $5D_{3/2}$ are chosen because of the small branching ratio from $6P_{3/2}$ to $5D_{3/2}$, which strongly suppresses spontaneous decay back into $|r_0\rangle$ and $|r_1\rangle$.

The cavity 510 is tuned on resonance with the $|0\rangle$ to $|e\rangle$ transition at 455 nm, at which wavelength the cavity mirrors 512a and 512b can have losses of about 20 ppm. (Unlike other ions for which the available mirror quality in the blue to UV region of the spectrum is problematic, especially those that use the cavity to enhance photon collection efficiency, our quantum computer does not require transmission through the mirrors and heralds away losses due to absorption.) A cavity 510 of length 2.8 mm with a 13 μm Gaussian mode waist has a Rayleigh range of 1170 μm, a linewidth of $\kappa=2\pi\times 341$ kHz, and gives a coupling strength of the Ba$^+$ ion to the cavity 510 of $g=2\pi\times 5.8$ MHz. With an excited state linewidth of $\Gamma=2\pi\times 25$ MHz, this gives a cavity cooperativity C=4.

With a cooperativity greater than unity, the coupling strength g to the cavity mode 511 is of similar strength to the geometric mean of the loss processes $\sqrt{\kappa\Gamma}$, meaning that on the order of half the transfer attempts between network elements 520 should be successful. A simulated photon transfer with these parameters gives an efficiency of around p=0.4 over 1.0 μs, making it possible to establish entanglement between any two Ba$^+$ ions on a microsecond timescale. This cavity could sit about 100 μm above electrodes forming a standard ion trap that would hold and trap the ions within the cavity mode. With standard ion trap inter-ion spacings of a few microns and a few tens of microns between chains, the cavity 510 could accommodate a few tens of ion chains, each containing a few tens of ions, within the cavity mode Rayleigh range and still have a few hundred microns of space between the ions and the cavity mirrors. This allows a quantum computer with several hundred all-connected ion chains.

Across the trapped ion chains in the cavity, the entanglement generation process includes iterating between a serial stage, where fast cavity transfers are carried out between all desired pairs of nodes, and parallelized fluorescence readout to verify transfer success and herald entanglement. During the serial stage, many pairs of communication qubits are sequentially selected and entangled using the scheme outlined in the previous section, then shelved in hyperfine states within the $5D_{5/2}$ manifold, the entire process taking a couple microseconds ($\tau_{serial}$) per pair of communication qubits. After attempting entanglement between all desired pairs of linear chains, a heralding fluorescence measurement on node B of each pair (fluorescence measurement on $6P_{1/2}$ with repumper emptying $5D_{3/2}$) reveals whether the transfer was successful; if it was, the network elements for nodes A and B are entangled within the $5D_{5/2}$ manifold. This readout can be done in parallel across all the pairs in $\tau_{parallel}$=30 μs. On average, pM of the chains are entangled in time $\tau_{parallel}$+M$\tau_{serial}$/2, so that the average amount of time taken to distribute entanglement between M chains is ($\tau_{parallel}$+M$\tau_{serial}$/2)/p. Local Coulomb gates between each network element ion with a corresponding qubit register ion followed by logical state readout of the communication ions completes the teleported CNOT gate.

The serial stage of the entanglement process can take just a few microseconds using the following pulse sequence with $^{137}$Ba$^+$ ions as the network elements. As the states used for transferring and shelving in the $5D_{5/2}$ manifold have magnetic quantum number $m_f$=0, we can neglect all other Zeeman states by using 7 polarized beams (the probability of populating other Zeeman states of mf is not equal to 0 is <$10^{-3}$ for a drive strength of 3 MHz, assuming 99% polarization purity and 10 MHz Zeeman splitting). The transitions used are then between states of different F quantum number, where off resonant transitions are at least 60 MHz detuned. With 3 MHz Raman Rabi frequency, high-fidelity Raman transitions of high-fidelity composite pulse sequences can occur on the microsecond timescale.

After parallelized state initialization, an entanglement attempt includes two sequential single photon transfers (each 1 μs) sandwiched around a single qubit rotation (1 μs), entangling any two communication qubits A and B, where A is then in the $6S_{1/2}$ manifold and B is in the $5D_{3/2}$ manifold. We can then quickly depump the $5D_{5/2}$ manifold (<<1 μs) in case it was populated by scattering during the transfers, following which the qubit states of A and B are coherently shelved in $|F=2, m_f=0\rangle$ and $|F=1, m_f=0\rangle$ states in the $5D_{5/2}$ manifold. Qubit A can be shelved using two Raman or 1762 nm tones directly coupling $|0\rangle_A$ and $|1\rangle_A$ to $5D_{5/2}$=2, $m_f$= 0$\rangle$ and $5D_{5/2}|F=1, m_f=0\rangle$. Shelving qubit B takes a few additional steps because of selection rules: first move $|r\_0\rangle_B$ to $5D_{5/2}|F=2, m_f=0\rangle$, then in parallel move $|r_1\rangle_B$ to $|r_0\rangle_B$ and $5D_{5/2}|F=2, m_f=0\rangle$ to $5D_{5/2}|F=0, m_f=0\rangle_B$, and finally now move $|r\_0\rangle_B$ to $5D_{5/2}|F=2, m_f=0\rangle_B$, so that $|r_0\rangle_B$ and $|r_1\rangle_B$ have been shelved in the $5D_{5/2}$ hyperfine manifold after 3×1 μs=3 μs.

When the transfer attempt fails, A and B may be left in the $6S_{1/2}$=2$\rangle$ manifold, so the last step is to depump them via $5P_{1/2}$ (<<1 μs) to ensure no stray ions couple to the cavity mode when we attempt entanglement between the next pair of communication qubits. If successful, the sequence leaves A and B shelved in a Bell state of the $5D_{5/2}$ manifold, and if unsuccessful with B pumped into either $5D_{3/2}$ or $6S_{1/2}$=1 $\rangle$, where in either case A and B are absent from $6S_{1/2}|F=2\rangle$ so the cavity is cleared for another transfer attempt. Summing the amount of time taken by the two single-photon transfers and the four single-qubit rotations gives $\tau_{serial}$=2× 1.0 μs+4×1 μs=6 μs. After the transfer attempts are completed, the communication qubits B are then fluorescence imaged on $6S_{1/2}$ to $5P_{1/2}$ with a repumper on $5D_{3/2}$ to determine which entangling attempts were successful.

Quantum Processors with Connected Cavities

Parallelization could be potentially incorporated into the quantum processor in several ways, including using multiple modes of a single cavity or by overlapping the modes of several distinct cavities. For example, while first and second network elements are being entangled via a first cavity mode, third and fourth network elements can be entangled using the same procedure via a second cavity mode. Separate cavities can also be coupled by fiber-optic links or free-space optical links. This parallelization allows a single quantum computer to include more local processors than a single cavity can hold.

Figure 6:
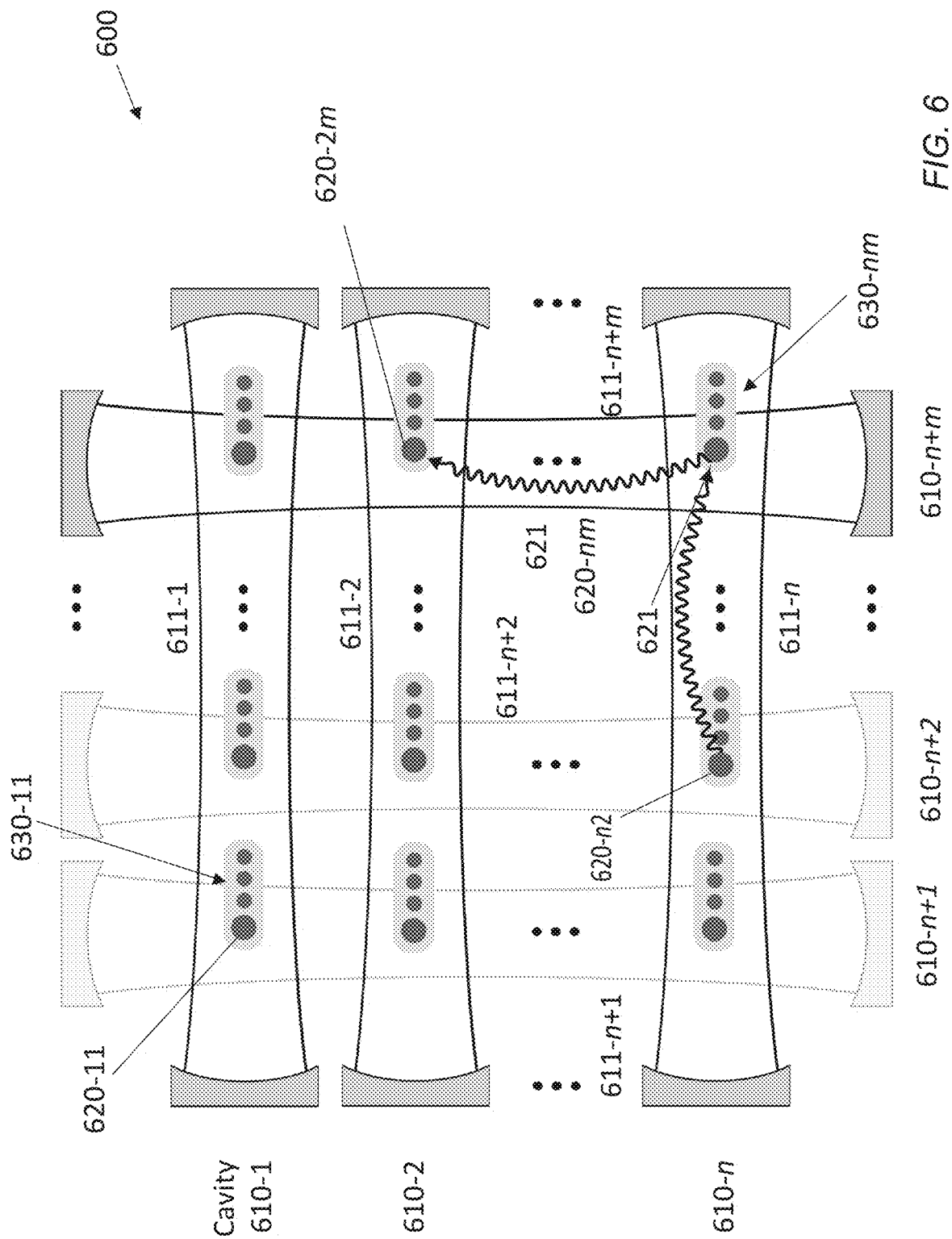
FIG. 6 shows a quantum computer with many local processors connected by overlapping cavity modes in space, in this case in a 2D layout.

FIG. 6 shows a quantum computer 600 with many local processors connected by overlapping cavity modes in space, in this case in a 2D layout. The quantum computer 600 includes n+m cavities 610-1 through 610-n+m arranged in n rows and m columns. The local processors, which in this case are trapped ion chains with respective network elements 620 and qubit registers 630, sit at the intersection points of a 2D grid arrangement of cavity modes 611 supported by the cavities 610. In this geometry, each network element 620 is trapped in a pair of orthogonally oriented cavities 610 can communicate with other network elements 620 in those cavities 610 by exchanging photons 621 via the corresponding cavity modes 611. In FIG. 6, for example, network element 620-nm is exchanging photons 621 with network element 620-n2 in cavity 610-n and with network element 620-2m in cavity 610-n+m. The quantum computer 600 may also include additional independent network elements to simplify or further parallelize the coupling of the different cavity modes.

Figure 7A:
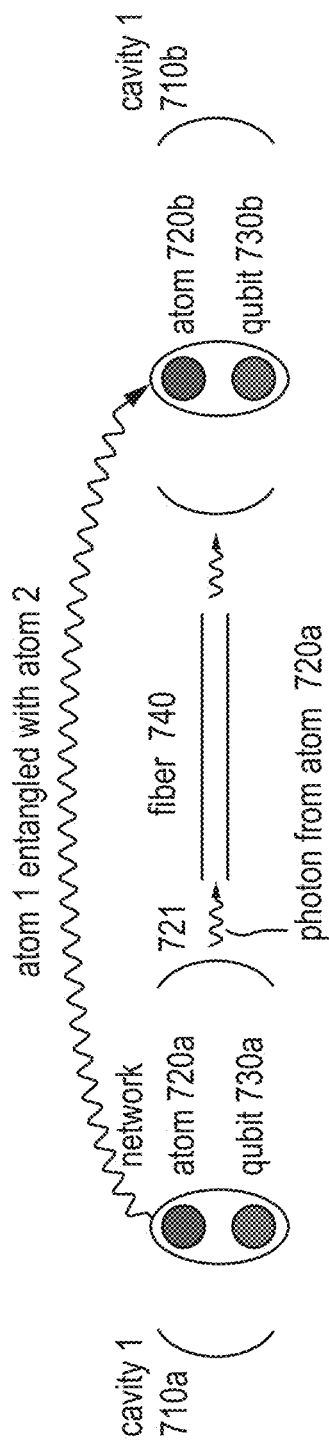
FIG. 7A illustrates a Rydberg-atom quantum processor that implements a teleported quantum gate using entangled network elements and qubits in different cavities coupled by an optical fiber.
Figure 7B:
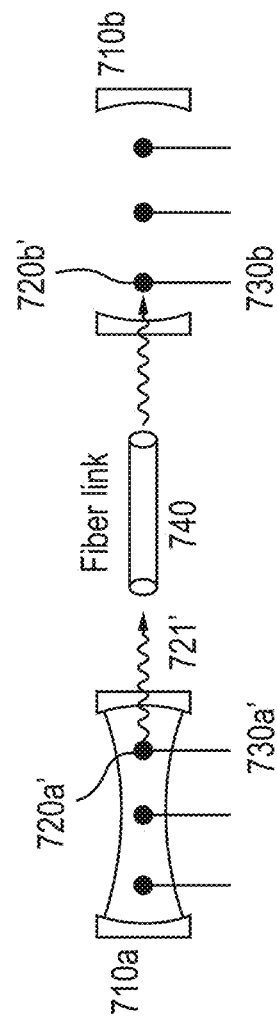
FIG. 7B illustrates trapped-ion quantum processors in different cavities connected via a fiber-optic link.

FIGS. 7A and 7B illustrate a two-qubit gate between nodes in separate cavities 710a and 710b connected via a fiber-optic link 740. In FIG. 7A, the nodes are based on Rydberg atoms with a first network element 720a in the first cavity 710a and a second network element 720b in the second cavity 710b. Each network element 720a, 720b interacts via local Rydberg interactions with a corresponding qubit register 730a, 730b. In FIG. 7B, the nodes are based on trapped ion chains, again with a first network element 720a' in the first cavity 710a and a second network element 720b' in the second cavity 710b. Each network element 720a', 720b' interacts via local Coulomb interactions with a corresponding qubit register 730a', 730b'.

In the arrangements shown in FIGS. 7A and 7B, a photon STIRAP transfer from network element 720a to 720b by letting a photon 721 emitted by network element 720a leak out of the first cavity 710a and into the optical fiber 740 (e.g., with a cavity-to-fiber coupling efficiency of about 90%), while performing the inverse STIRAP operation on network element 720b at the receiving cavity 710b. This cavity-fiber-cavity coupling can be extended to build an even larger all-connected quantum computer using an array of cavities, coupled to each other via optical fibers and one or more ultrafast, ultra-low loss fiber optical switches. It can also be used to couple different types of local processors (e.g., processor with different atoms) in different cavities using nonlinear optics to shift the photon wavelengths.

Fast Remote-Entanglement Distribution Using Many Network Elements with Cavity-Enabled Optical Decoupling One challenge facing ultimate scaling for any quantum computing architecture is creating small modules that can effectively be reproduced in large quantities and connected together to make a very large quantum computer. The connections among modules should be fast and connecting the modules should not disturb the quantum information in the modules. Here, we describe an architecture where cavities allow decoupling of the creation of remote connection between modules from the local processors that store the quantum information. This allows much faster communication rates into/out of modules through parallelization and isolates the quantum information in each module from the noise introduced by the entanglement distribution to establish connections. The methods work for many possible platforms, including trapped ions and neutral atoms, such as Rydberg atoms. We include additional details and figures outlining some ways this could look for trapped ion and neutral Rydberg atom systems and explain the advantages of using our approach.

One challenge with trapped-ion quantum computers is entangling the trapped ion chains. Remote entanglement through the joint detection of two photons emitted by spatially separated ions is one proposed way to scale trapped ion quantum computers beyond single chains. With current methods, the remote entanglement is typically attempted many (e.g., thousands) of times before a successful event because of the difficulty in efficiently collecting, routing, and detecting emitted single photons. Despite heroic experimental efforts, because of the low success probability, record entanglement speeds of only about 5 ms have been achieved under ideal conditions (without additional overheads necessary for scalable implementation), which is much slower than local operations with speeds of 10-50 μs.

Directly establishing remote entanglement between two ion chains to use for information processing would typically involve having both communication qubits and memory qubits on the ion chains of sizes limited to a few tens of ions, since local operation fidelity is compromised when the ion chains are longer than a few tens of ions. This presents two technical problems as a method for scaling: (1) the slow (e.g., millisecond-scale) entanglement speed bottlenecks the overall computation, making the computation much slower and more susceptible to technical noise; and (2) the repeated entanglement attempts of the communication qubits on the chains leads to heating, leading to more cooling, technical noise, delays, and memory qubit errors.

Proposals to increase remote entanglement rates by attempting parallel entanglement generation across many communication qubits on the same chain tend to be limited by the small number of ions (e.g., a few tens of ions) that can be fully connected with high-fidelity local operations to the memory qubits also on the chain. Moreover, these proposals do not address the noise introduced by trying to remotely entangle communication qubits on a common chain with memory qubits.

Other proposals include changing the ion trap potentials in time to move separately entangled communication qubits from elsewhere onto the chains with the memory qubits. This could enable the communication ions to be entangled while not in contact with the memory qubits and could allow parallelized entanglement attempts across many communication qubits as they are not constrained to be on the chains with the memory qubits. However, once entangled, the communication qubits should be physically moved onto the memory qubit chains by altering the trap potentials. Unfortunately, these splitting and merging operations heat the ion chains, involving many milliseconds of re-cooling after each operation, and so ultimately fail to eliminate the millisecond-scale processing time bottleneck while introducing additional noise sources to the memory qubits.

FIGS. 8A-8E illustrate the use of photon transfers in a cavity to form a module that houses some memory qubits (quantum registers) and can be quickly and cleanly entangled with identical remote modules. Different modules can efficiently be entangled, and many modules together could make up a quantum computer.

Figure 8A:
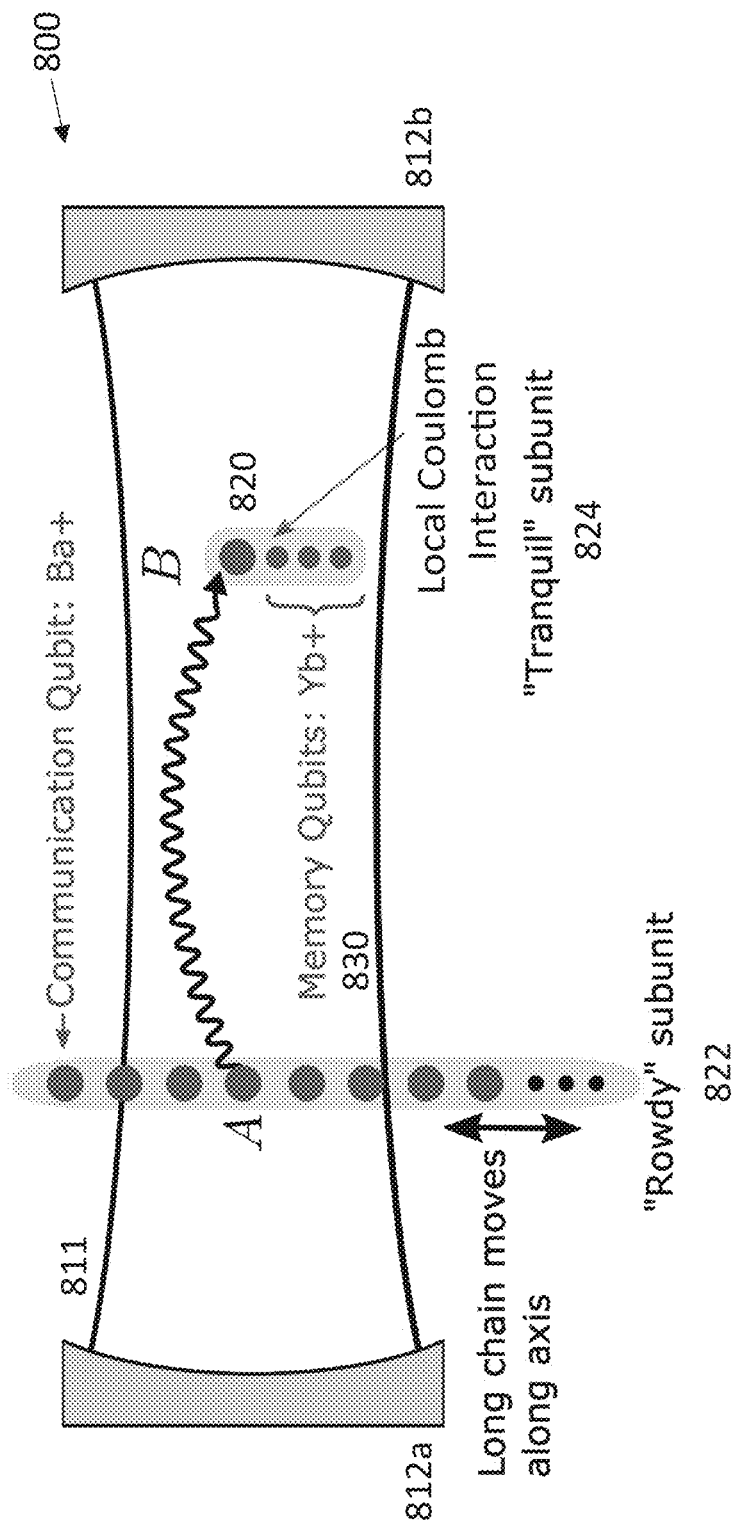

FIG. 8A shows an example module 800, with a trapped ion chain called a tranquil subunit 824 (a trapped-ion local processor), which includes a communications qubit (network element) 820 and one or more memory qubits (qubit registers) 830, trapped in a cavity 810 formed by mirrors 812a and 812b. The tranquil subunit's communications qubit 820 is optically interfaced via the cavity mode 811 with an auxiliary ensemble of separately trapped ions called a rowdy subunit 822. The ions in the rowdy subunit 822 act as network elements and can be arranged, for example, in a 2D array containing 50-100 elements or in a very long linear chain (this chain can be long since it does not have to support local operations between ions). The ions in the rowdy subunit 822 can be moved into and out of the volume of the cavity mode 811 (e.g., using optical tweezers) for entanglement with the tranquil subunit's communications qubit 820 as indicated by the double-headed arrow in FIG. 8A.

The rowdy subunits 822 of any two modules 800 can realize massively parallelized entanglement attempts, including those described below with respect to FIGS. 9A-9D. The optical cavity 810 decouples the memory qubits 830 in the tranquil subunit 824 from the rowdy subunit 822. Photon transfers through the optical cavity 810 move entanglement from the rowdy subunit 822 onto the tranquil subunit 824 on a sub-microsecond timescale without appreciable heating. These photon transfers can be realized in a manner similar to the those described in greater detail below and can be heralded in a similar manner to eliminate attempts where photons are lost during transfer attempts. Once a communication ion in the rowdy subunit 822 becomes remotely entangled, it is moved into or stored in the volume of the cavity mode 811 (e.g., with optical tweezers), at which point single-photon transfers through the cavity 810 quickly move the entangled state onto a communication qubit 820 of the tranquil subunit 824. By inducing network elements (ions) in the rowdy subunit 822 to emit photons in rapid succession or in parallel, remote entanglement rates can be increased by a factor of 50-100 or more, bringing it in line with local operations speeds.

Figure 8B:
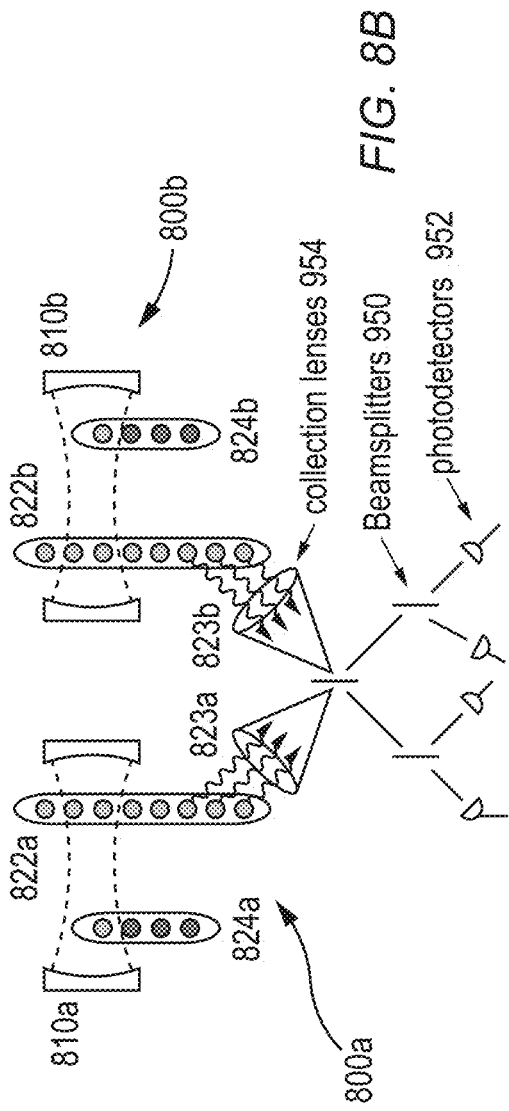
Figure 8C:
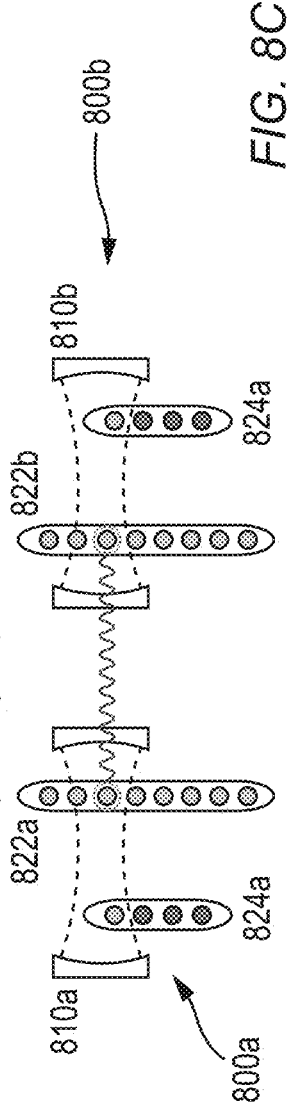

FIGS. 8B-8E show fast (e.g., microsecond-scale) entanglement of network elements in tranquil submits 824a and 824b in different cavities 810a and 810b via both the cavity modes and rowdy subunits 822a and 822b. In FIGS. 8B and 8C, the many communication qubits on the rowdy subunit 822a and 822b are excited in parallel and allowed to fluoresce. They emit superpositions of photon polarizations 823a and 823b which are collected with lenses 854, overlapped on beam splitters 850 to allow state mixing, and then detected with photodetectors 852 to enable heralded distribution of entanglement between ions contained on each rowdy subunit 822a and 822b. In FIG. 8D, the entanglement is transferred via a single-photon transfer 821a, 821b through each cavity 810a, 810b from each rowdy subunit 822a, 822b to the corresponding tranquil subunit 824a, 824b in less than a microsecond. In FIG. 8E, the entanglement is now on the memory qubits in the tranquil subunits 824a and 824b. Local operations between memory and communication qubits on the tranquil subunits 824a and 824b can now consume this entanglement to realize a teleported quantum gate between two modules 800a and 800b.

Figure 8F:
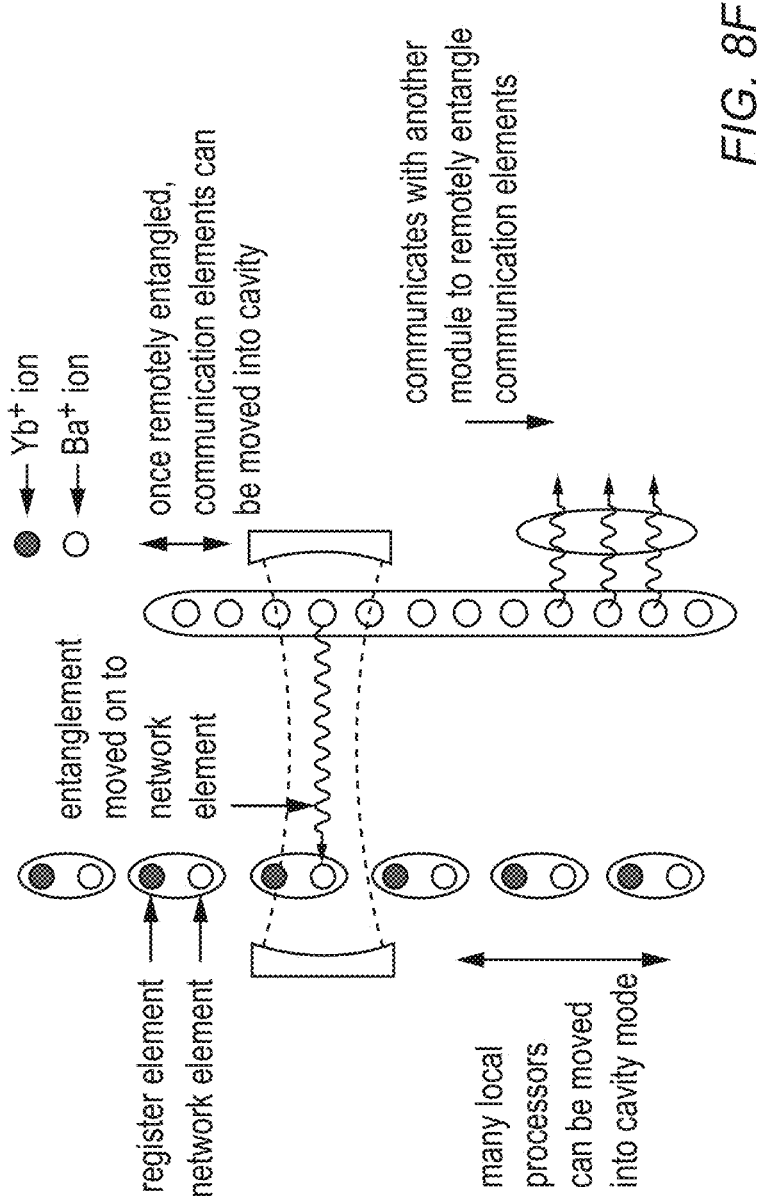
FIG. 8F illustrates parallelized remote entanglement distribution between modules containing many local processors which can be moved in and out of the cavity.

FIG. 8F shows an example where many local processors, each including network elements and register qubit elements, can be moved into the cavity to interface with qubits in a long chain of communication elements, which can be remotely entangled with other distant modules. Local processors and remotely entangled communication elements and can both be moved into the same cavity mode which is used to swap or transfer the entangled state from the communication element onto the network element of the local processor.

Figure 8G:
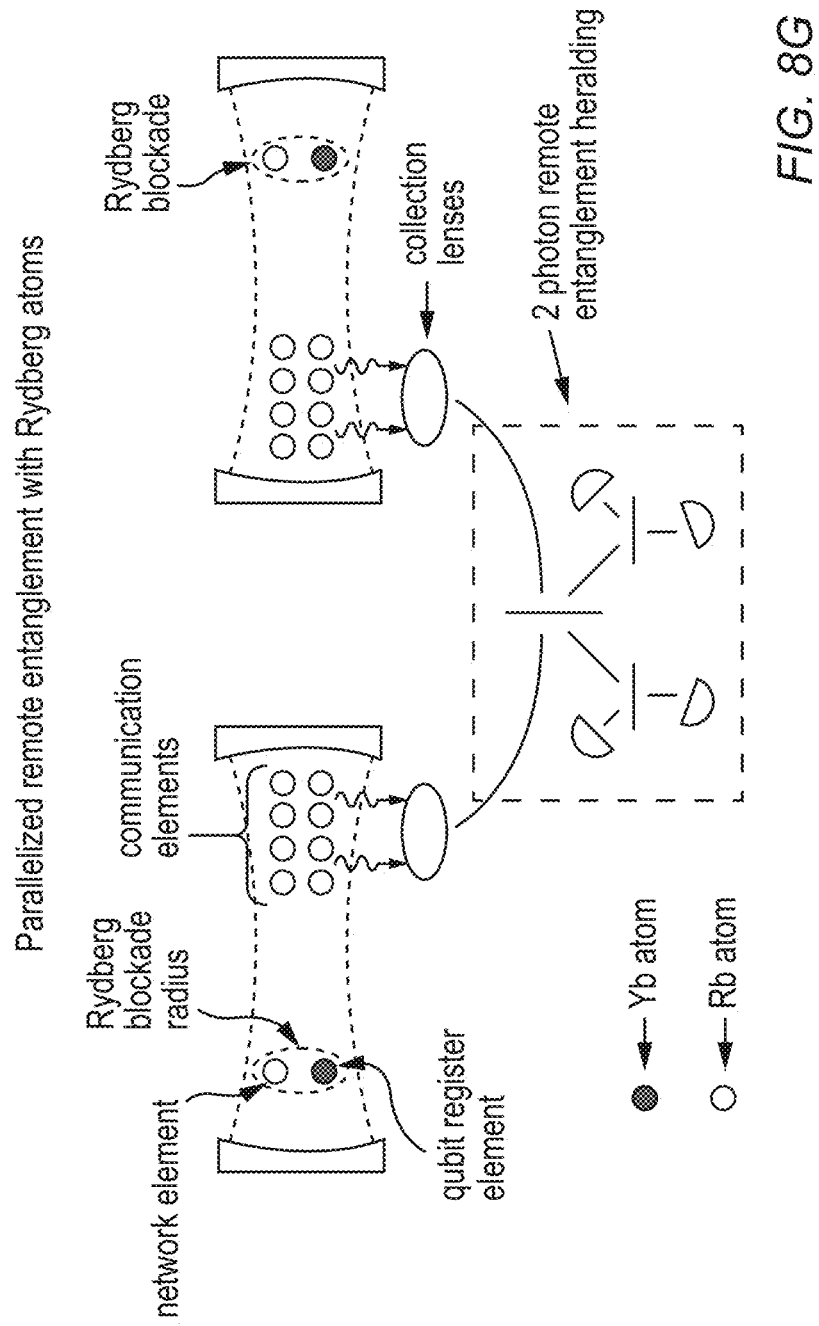
FIG. 8G illustrates parallelized remote entanglement distribution between two cavities containing local processors comprising a Rubidium Rydberg network element and a Ytterbium network memory qubit.

FIG. 8G shows an example where the communication and network elements are Rydberg atoms, and the network element and qubit register element are trapped within the same Rydberg blockade radius to realize a local Rydberg interaction. Following parallelized remote entanglement of the communication elements, successfully entangled communication elements have their states transferred via the cavity modes to the network elements, where the entanglement interfaces directly with the qubit register element via the Rydberg interaction between each network element and its nearby qubit register element.

Figure 8H:
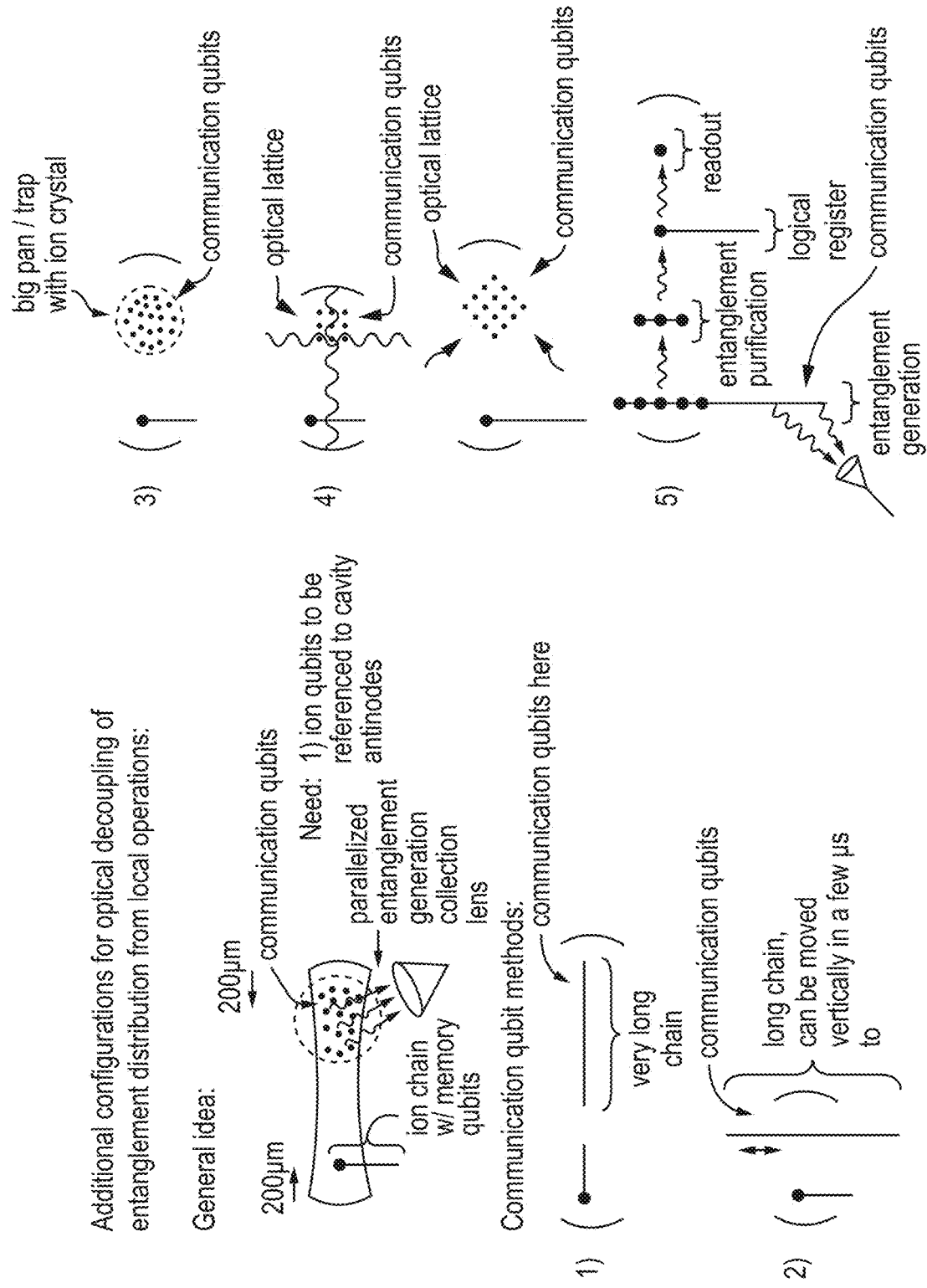
FIG. 8H illustrates additional configurations of local processors comprising a memory register and a network element with communication elements inside an optical cavity.

FIG. 8H shows various configurations for trapping communication elements and local processors containing qubit register and network elements within or near a cavity. In general, the communication elements can either all be stored in the cavity mode or can be remotely entangled with distant modules outside the cavity mode, then moved into the cavity mode to swap the entangled state over onto a local processor.

FIGS. 9A-9D illustrate additional ways of parallelized, fast, remote entanglement between local processors using an auxiliary set of network elements to establish entanglement between network elements in distant cavities. These auxiliary network elements can emit photons either in rapid succession by iterating over the network elements or simultaneously, making it possible to speed-up entanglement distribution by multiplexing. Once one of the auxiliary network elements is entangled with a network element in a distant or remote cavity, the quantum state of the auxiliary network element can be mapped via the cavity onto the state of the local processor's network element, allowing the local processor's register qubit to communicate with the local processor in the distant cavity.

Figure 9B:
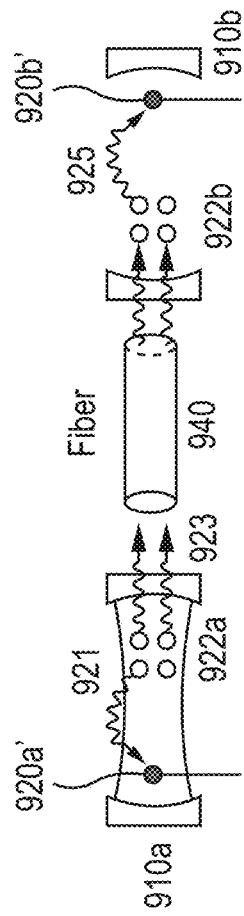
FIGS. 9B-9D illustrate how communication elements can be used for two-photon entanglement heralding.
Figure 9A:
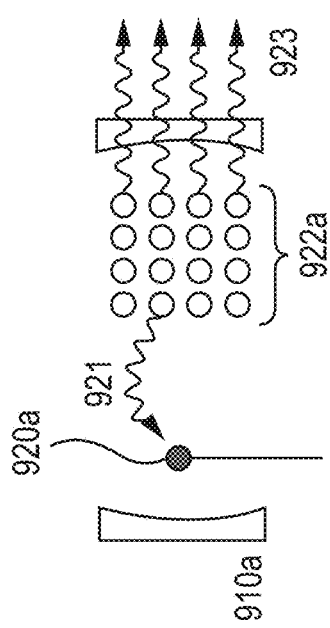
FIG. 9A illustrates a trapped-ion local processor with a set of communication elements for rapid serial or parallel communications with other local processors.
Figure 9D:
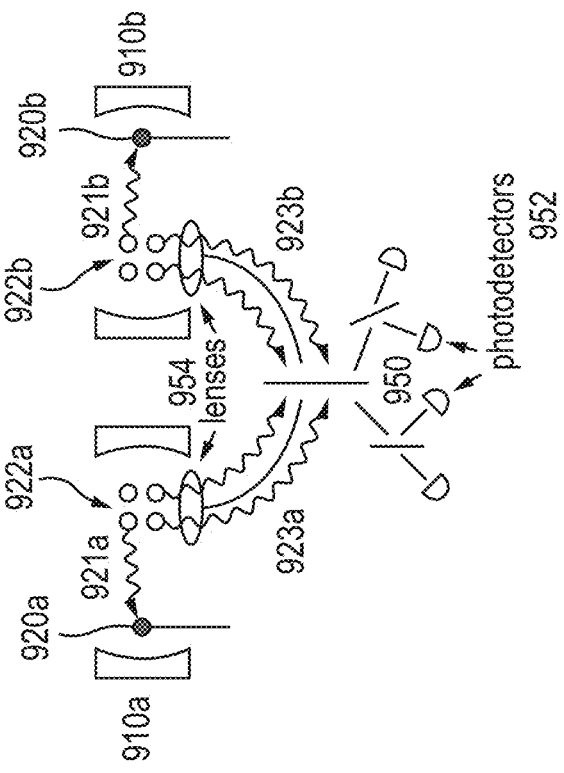
Figure 9C:
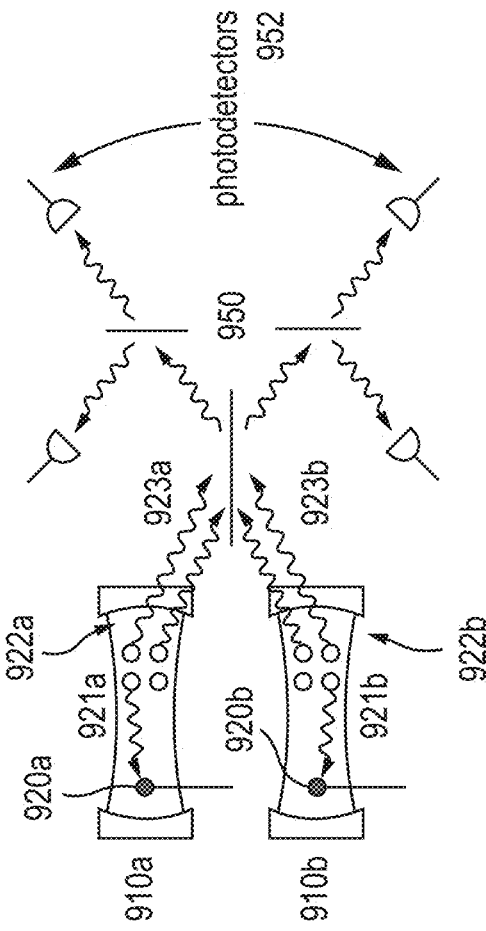

FIG. 9A shows a cavity 910a with a trapped-ion local processor whose network element 920a communicates with a set of auxiliary network elements 922a that are trapped in the cavity 910a too. Photons 923 emitted by the auxiliary network elements 922a can be coupled to auxiliary network elements 922b in another cavity 910b via an optical fiber 940 for entangling network element 920a with network element 920b as in FIG. 9B. Photons 923 emitted by the auxiliary network elements 922a, 922b can also be for two-photon heralding as shown in FIGS. 9C and 9D. Two-photon heralding can be carried out as in FIG. 8A, where the rowdy subunits 822 emit photons that are collected, mixed on beam splitters, and subsequently detected with photodetectors. Photodetection signals that an ion in each of the rowdy subunits in FIG. 8A are entangled. This is the slow, noisy process that we are proposing to decouple from the memory qubits and parallelize in order to create an actually functional trapped ion module. In FIG. 9C, the photons 923a, 923b emitted by the auxiliary network elements 922a, 922b are coupled out of the cavities 910, 910a and overlapped on cascaded beam splitters 950 and detected with photodetectors 952. In FIG. 9D, lenses 954 collect the photons 923a, 923b and overlapped them on the cascaded beam splitters 950.

Figure 10:
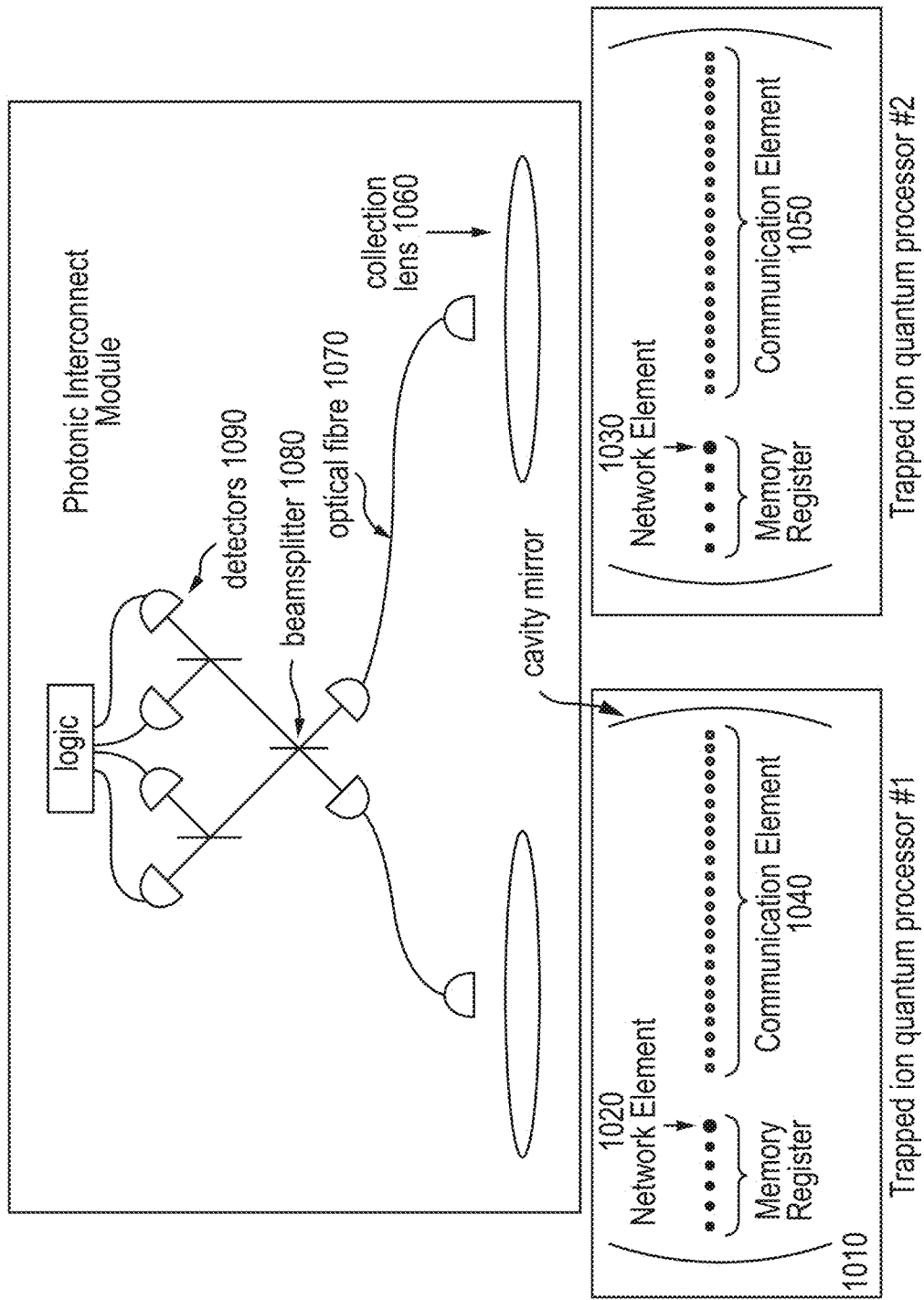
FIG. 10 illustrates remote entanglement generation between two network elements in remote cavities facilitated by cavity-mediated transfers with entangled communication elements.

FIG. 10 shows a cavity 1010 with a trapped-ion local processor whose network element 1020 communicates with a network element in a second cavity 1030 via communication elements 1040 in the first cavity and 1050 in the second cavity 1030. Communication involves first remote entangling a communication element in the first cavity 1010 with a communication element in the second cavity 1030 by detecting photons emitted by each to be in a particular Bell state. The entangling measurement is done using collection optics 1060, optical fibers 1070, multiple beam splitters 1080 and single-photon counting modules 1090. Once two communication elements are entangled, the state of each communication element is transferred via the cavity mode to the network element, thus entangling the two network elements across the two cavities. A teleported quantum gate can then be performed between a memory qubit in the first cavity and a memory qubit in the second cavity via the entangled network elements. FIG. 10 illustrates a configuration of memory qubits, network, and communication elements amenable to a 1D ion trap, but in general different geometric configurations of memory qubits, network elements, and communication elements, including those that involve moving either or both into and out of the cavity, are possible.

Figure 11:
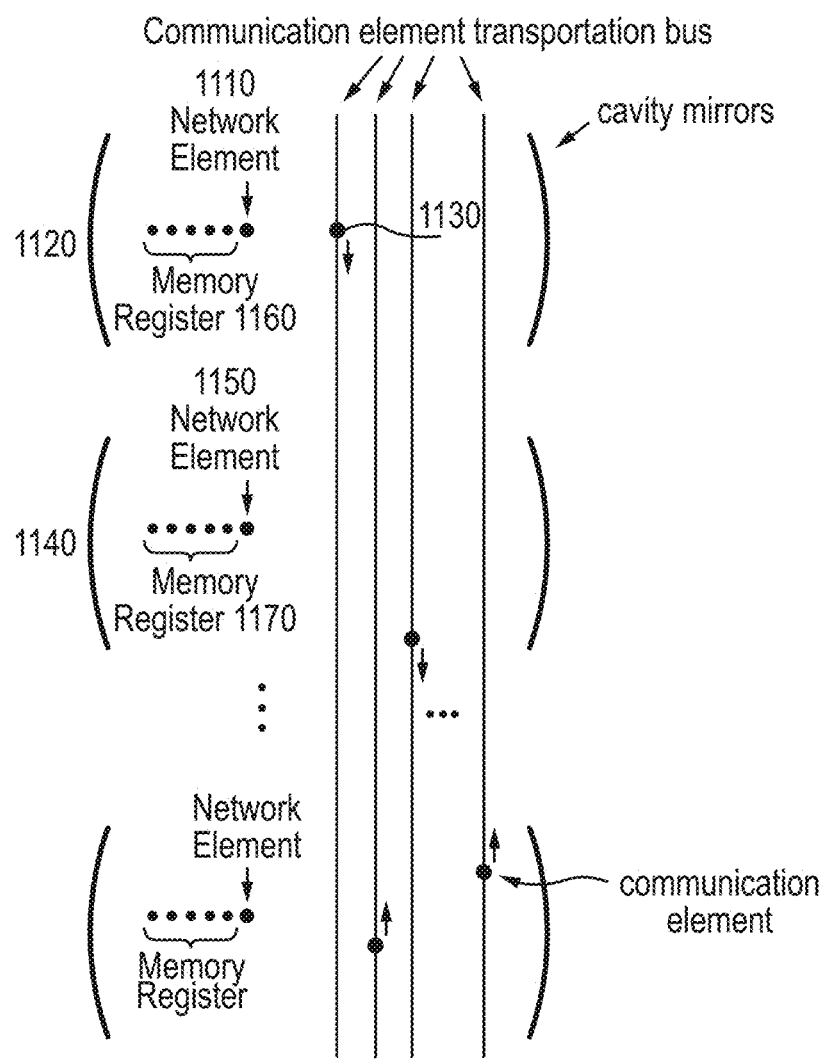
FIG. 11 illustrates how multiple non-overlapping cavities can be connected using multiple communication elements which can travel from cavity to cavity on a rail.

FIG. 11 shows how multiple non-overlapping cavities might be interconnected using multiple communication elements able to travel on a rail between cavities. To enact a teleported quantum gate between two memory qubits in two cavities, first the network element 1110 in in the first cavity 1120 is entangled with an available communication element (perhaps on rail 1 1130). Next, the communication element on rail 1 moves along the rail until it enters the mode of the second cavity 1140. The state of the communication element on rail 1 is then transferred via the mode of the second cavity onto the network element in the second cavity 1150. The network element in the first cavity is now entangled with the network element in the second cavity, and a teleported gate between a memory qubit in the first cavity 1160 and a memory qubit in the second cavity 1170 is now possible. FIG. 11 illustrates that multiple cavities can be interconnected without overlapping cavities or single-photon collection and detection.

Entanglement State Transfer Protocol

Here we explicitly show one transfer protocol to move the quantum state of a communication qubit from the rowdy subunit onto the tranquil subunit. It uses the same level structure as shown in FIG. 5B and can be enacted with the same $^{137}Ba^+$ levels used for entanglement generation described above.

Here, A denotes a communication qubit on a rowdy subunit, and B denotes a communication qubit on a tranquil subunit. After a rowdy subunit ion A is remotely entangled, we want to move its quantum state over to ion B on the tranquil subunit via the cavity. For generality we begin with A in a superposition state and show that we can move this state to B via the cavity:

$$|\Psi\rangle = (|r_0\rangle_A + |r_1\rangle_A)|0\rangle_B \quad (1)$$

Then, a photon is transferred through the cavity from A to B. This transfer can be effected using two-photon Raman $\pi$ pulses with nonzero detuning $\Delta$ to release a photon from A and cause B to absorb the photon, or with small detuning $\Delta$ through a stimulated Raman adiabatic passage (STIRAP)

dark state by ramping up $\Omega_A$ while ramping down $\Omega_B$. During this transfer, the photon may leak out of the cavity or scatter off of the intermediate excited state of A or B. This gives $|r_0\rangle_A|0\rangle_B \rightarrow \alpha|0\rangle_A|r_0\rangle_B + \beta|\text{Loss}\rangle$), where $|\text{Loss}\rangle$ represents some state where the photon has scattered into a mode outside the cavity and the network element is left in some ground state:

$$|\Psi\rangle = (\alpha|0\rangle_A|r_0\rangle_B + \beta|\text{Loss}\rangle) + |r_1\rangle_A|0\rangle_B \quad (2)$$

($|\text{Loss}\rangle$ is a state where the network elements are in a ground state and there is no photon in the cavity. Since the ground states are coupled only to the excited states by the cavity mode, once the system is in the state $|\text{Loss}\rangle$, A and B cannot evolve from their ground states, so a state $|\text{Loss}\rangle$ maps to a state $|\text{Loss}\rangle$ under any further operations.)

In order to repeat the transfer on the other component, the quantum processor swaps between the two states $|r_0\rangle_x$, $|r_1\rangle_x$ on A and B:

$$|\Psi\rangle = (\alpha|0\rangle_A|r_1\rangle_B + \oplus\beta|\text{Loss}\rangle) + |r_0\rangle_A|0\rangle_B \quad (3)$$

The quantum processor then executes a STIRAP that affects only the last term in Eq. (3). If the cavity/excited-state losses are repeatable by using identical laser pulses, ramping $\Omega_A$ and $\Omega_B$ with the same profiles as before (so that a and for the losses here are the same as before) yields:

$$|\Psi\rangle = (\alpha|0\rangle_A|r_1\rangle_B + \beta|\text{Loss}\rangle) + (\alpha|0\rangle_A|r_0\rangle_B + \beta|\text{Loss}\rangle) =$$
$$\alpha|0\rangle_A(|r_1\rangle_B + |r_0\rangle_B) + 2\beta|\text{Loss}\rangle$$

B has the quantum state that was initially on A, provided that the photon was not lost during the procedure. At this point, we could probe network element B and verify that it is not in a ground state to check that the entanglement was successful.

In the $^{137}$Ba$^+$ ion implementation, a fluorescence measurement of the ground state of B could be employed, taking a few tens of microseconds for verification of the transfer.

Using the protocol outlined above, the transfer speed for a module containing a rowdy subunit and a tranquil subunit can be on the order of microseconds. Specific parameters that could work would include using Ba$^+$ ions with a level structure shown in FIG. 5B. The cavity is tuned to the $|S_{1/2}, F=2, m_F=0\rangle$ to $|P_{3/2}, F=3, m_F=0\rangle$ transition at 455 nm, at which wavelength, the losses in the cavity mirrors can be as low as 20 ppm. A cavity of length 0.5 mm with a 3-micron Gaussian mode waist has a coupling strength of the ion to the cavity of g=46 MHz. With an excited state lifetime of 25 MHz, this gives a simulated photon transfer efficiency of around 81% about 0.2 microseconds, making it possible to move a quantum state from the rowdy subunit to the tranquil subunit on the microsecond timescale. Since this transfer should be successful on two separate modules simultaneously (see FIGS. 8B-8E), entanglement is moved from the rowdy subunits to the tranquil subunits a fraction of $(0.81)^2 = 0.66$ of the time, presenting only a small overhead. The transfer success is verified with fluorescence measurements on the ground state of the communication qubit of the destination or target tranquil subunit, the slowest part of the procedure, taking a few tens of microseconds.

Since other remote entanglement techniques take about 5 ms to entangle a given rowdy subunit communication qubit, employing a rowdy subunit of 200 ions undergoing parallelized remote entanglement would generate an entangled pair every 5 ms/200=25 µs, which could then be moved onto the respective tranquil subunits successfully 66% of the time and verified within about 30 µs via fluorescence measurement. This would then be a complete method for fast delivery of entanglement onto the tranquil chains, at which point local operations of similar speeds (e.g., 10-50 µs) would consume the entanglement for computation.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of quantum information processing with a cavity containing a first qubit register, a first network element, a second qubit register, and a second network element, the method comprising:
    attempting to entangle the first network element with the second network element via a mode of the cavity;
    determining whether the first network element is entangled with the second network element; and
    in response to determining that the first network element is entangled with the second network element, enacting a teleported quantum gate on the first qubit register and the second qubit register via the first network element and the second network element.

2. The method of claim 1, wherein the first network element is a first atom and the second network element is a second atom.

3. The method of claim 1, wherein the first network element comprises a first trapped ion and the second network element comprises a second trapped ion.

4. The method of claim 1, wherein the first qubit register and the second qubit register are non-neighboring qubit registers in an array of qubit registers and the first network element and the second network element are non-neighboring network elements in an array of network elements.

5. The method of claim 1, wherein attempting to entangle the first network element with the second network element comprises:
    causing the first network element to emit a first photon into the mode of the cavity; and
    causing the second network element to absorb the first photon.

6. The method of claim 1, wherein determining whether the first network element is entangled with the second network element comprises measuring the second network element.

7. The method of claim 1, wherein determining whether the first network element is entangled with the second network element comprises:
    causing the second network element to emit a second photon into the mode of the cavity; and
    absorbing the second photon by a third network element.

8. The method of claim 1, wherein enacting the teleported quantum gate occurs with an error of less than $10^{-2}$.

9. The method of claim 1, wherein enacting the teleported quantum gate comprises:
    performing a first local operation between the first qubit register and the first network element; and
    performing a second local operation between the second qubit register and the second network element.

10. The method of claim 9, wherein performing the first local operation comprises enacting a Rydberg interaction between the first qubit register and the first network element.

11. The method of claim 9, wherein performing the first local operation comprises enacting a Coulomb interaction between the first qubit register and the first network element.

12. The method of claim 9, further comprising, before attempting to entangle the first network element with the second network element:
    trapping the first qubit register within a Rydberg blockade radius of the first network element; and
    trapping the second qubit register within the Rydberg blockade radius of the second network element.

13. The method of claim 9, further comprising, before attempting to entangle the first network element with the second network element:
    trapping the first qubit register within an ion chain containing the first network element; and
    trapping the second qubit register within an ion chain containing the second network element.

14. A method of quantum information processing with a first qubit register, a first network element, a second qubit register, and a second network element, the method comprising:
    deterministically establishing a Bell pair between the first network element and the second network element;
    enacting local gates between the first network element and the first qubit register and between the second network element and the second qubit register;
    measuring states of the first network element and the second network element; and enacting single-qubit gates on the first qubit register and the second qubit register based on the states of the first network element and the second network element, wherein deterministically establishing the Bell pair between the first network element and the second network element comprises:

transmitting a photon from the first network element to the second network element through a cavity containing the first network element and the second network element;

absorbing the photon at a second network element; and measuring the second network element to have absorbed the photon to ensure that first network element and the second network element are projected into a Bell state.

15. A method of quantum information processing with a first qubit register, a first network element, a second qubit register, and a second network element, the method comprising:

deterministically establishing a Bell pair between the first network element and the second network element;

enacting local gates between the first network element and the first qubit register and between the second network element and the second qubit register;

measuring states of the first network element and the second network element; and enacting single-qubit gates on the first qubit register and the second qubit register based on the states of the first network element and the second network element, wherein deterministically establishing the Bell pair between the first network element and the second network element comprises:

transmitting a photon from the first network element to the second network element via an optical fiber connecting a first cavity containing the first network element and the first qubit register and a second cavity containing the second network element and the second qubit register;

absorbing the photon at the second network element; and measuring the second network element to have absorbed the photon to ensure that first network element and the second network element are projected into a Bell state.

* * * * *